United States Patent
Rood et al.

(10) Patent No.: US 8,940,077 B2
(45) Date of Patent: Jan. 27, 2015

(54) INDIRECT REAL-TIME MONITORING AND CONTROL OF ELECTRICAL RESISTIVELY HEATED ADSORBENT SYSTEM

(71) Applicant: The Board of Trustees of the University of Illinois, Urbana, IL (US)

(72) Inventors: Mark J. Rood, Champaign, IL (US); David Johnsen, Downers Grove, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 98 days.

(21) Appl. No.: 13/773,113

(22) Filed: Feb. 21, 2013

(65) Prior Publication Data

US 2013/0174729 A1    Jul. 11, 2013

Related U.S. Application Data

(63) Continuation-in-part of application No. 12/827,630, filed on Jun. 30, 2010, now Pat. No. 8,500,853.

(60) Provisional application No. 61/266,789, filed on Dec. 4, 2009, provisional application No. 61/604,618, filed on Feb. 29, 2012.

(51) Int. Cl.
*B01D 53/02* (2006.01)
*B01D 53/04* (2006.01)

(52) U.S. Cl.
CPC .... *B01D 53/0454* (2013.01); *B01D 2257/7022* (2013.01); *B01D 53/0438* (2013.01); *B01D 2259/40096* (2013.01)
USPC .......... 95/1; 95/115; 95/143; 95/148; 96/126; 96/130; 96/146; 62/606

(58) Field of Classification Search
USPC ............. 62/606; 95/1, 115, 143, 148; 96/126, 96/130, 146
See application file for complete search history.

(56) References Cited

U.S. PATENT DOCUMENTS

| | | |
|---|---|---|
| 3,176,444 A | 4/1965 | Kiyonaga |
| 3,963,460 A | 6/1976 | Stumpf et al. |

(Continued)

FOREIGN PATENT DOCUMENTS

WO    WO 2007/133602    11/2007

OTHER PUBLICATIONS

Del Vecchio, N. D., et. al., "New Method for Monitoring of Adsorption Column Saturation and Regeneration I. Demonstration of the Measurement Principle", *Chem. Eng. Comm.*, 2002, vol. 189(3), pp. 352-371.

Del Vecchio, N. D., et. al., "New method for monitoring of adsorption column saturation and regeneration II: on-line measurement", *Chemical Engineering Science*, 59, 2004, 2389-2400.

(Continued)

*Primary Examiner* — Christopher P Jones
(74) *Attorney, Agent, or Firm* — Greer, Burns & Crain, Ltd.

(57) ABSTRACT

A method for indirectly monitoring and controlling an electrically resistive adsorption system. Adsorption of a predetermined adsorbate is conducted while indirectly monitoring electrical resistance of a unified adsorbent element. Breakthrough is predicted based upon the indirectly monitored electrical resistance and a previously measured mass loading relationship between the resistance of the unified adsorbent element and the loading of the unified resistance element with the predetermined adsorbate. Adsorption, regeneration and cooling cycles are controlled by a controller without any direct measurement of temperature or resistance of the element and characterizations of mass loading and temperature. Systems of the invention can have no sensors that contact the element, are in an adsorption vessel, and/or are downstream adsorption vessel.

13 Claims, 16 Drawing Sheets

(56) References Cited

U.S. PATENT DOCUMENTS

| | | | |
|---|---|---|---|
| 4,043,770 | A | 8/1977 | Jakob |
| 4,317,808 | A | 3/1982 | Voigt et al. |
| 4,537,760 | A | 8/1985 | Lavie |
| 4,624,841 | A | 11/1986 | Hidaki |
| 4,718,240 | A | 1/1988 | Andeen et al. |
| 4,784,672 | A | 11/1988 | Sircar |
| 4,831,208 | A | 5/1989 | Zarchy |
| 4,846,852 | A | 7/1989 | Schweitzer et al. |
| 5,000,925 | A | 3/1991 | Krishnamurthy et al. |
| 5,110,328 | A | 5/1992 | Yokota et al. |
| 5,125,935 | A | 6/1992 | Nakaya et al. |
| 5,230,877 | A | 7/1993 | Eimer et al. |
| 5,308,457 | A | 5/1994 | Dalla Betta et al. |
| 5,388,637 | A | 2/1995 | Jones et al. |
| 5,567,229 | A | 10/1996 | Klobucar et al. |
| 5,746,788 | A | 5/1998 | Schmidt et al. |
| 5,912,423 | A | 6/1999 | Doughty et al. |
| 5,912,424 | A | 6/1999 | Judkins et al. |
| 5,968,232 | A | 10/1999 | Whitlock |
| 6,315,977 | B1 | 11/2001 | Cantacuzene |
| 6,322,356 | B1 | 11/2001 | Gupta et al. |
| 6,364,936 | B1 | 4/2002 | Rood et al. |
| 6,527,836 | B1 | 3/2003 | White et al. |
| 6,593,747 | B2 | 7/2003 | Puskas et al. |
| 6,613,126 | B2 | 9/2003 | Tange et al. |
| 6,660,063 | B2 | 12/2003 | Tom et al. |
| 6,726,746 | B2 | 4/2004 | Dai et al. |
| 6,764,670 | B2 | 7/2004 | Henderson |
| 7,316,731 | B2 | 1/2008 | Farant et al. |
| 8,080,095 | B2 | 12/2011 | Rood et al. |
| 2005/0139546 | A1 | 6/2005 | Burke |
| 2008/0184886 | A1 | 8/2008 | Tufts et al. |
| 2009/0293725 | A1 | 12/2009 | Rood et al. |
| 2011/0132031 | A1 | 6/2011 | Rood et al. |

OTHER PUBLICATIONS

Johnsen, David L., et. al., "Temperature Control during Regeneration of Activated Carbon Fiber Cloth wtih Resistance-Feedback", *Environ. Sci. Technol.*, 2012, 46, 11305-11312.

McIntosh, R., et.al., "The Effect of Physical Adsorption on the Electrical Resistance of Activated Carbon", *The Journal of Chemical Physics*, vol. 15, No. 1, Jan. 1947.

Emamipour, H., et al., Steady-State and Dynamic Desorption of Organic Vapor from Activated Carbon with :, ..•. Electrothermal Swing Adsorption. *Environ. Sci. Technol.* 2007, 41, 5063-5069.

Hashisho, Z., at al., Rapid Response Concentration-Controlled Desorption of Activated Carbon to Dampen Concentration Fluctuations. *Environ. Sci. Technol.* 2007,41, 1753-1758.

Kolade, M. A.; et. al., Adsorptive reactor technology for VOCabatement. *Chemical Engineering Science* 2009, 64 (6), 1167-1177.

McIntyre, J.A.; et.al., High Enrichment and Recovery of Dilute Hydrocarbons by Dual Reflux Pressure-Swing Adsorption, *Industrial Chemical Engineering Research.* 2002.41.3499-3504.

Nitsche, V.; et. al., Separation of organic vapors by means of membranes. *Chemical Engineering & Technology* 1998,21 (12), 925-935.

Subrenat, A. S.; et. al., Volatile organic compound (VOC) removal by adsorption onto activated carbon fiber cloth and electrothermal desorption: An industrial application. *Chemical Engineering Communications* 2006, 193 (4), 478-486.

Sullivan, P. D.; et.al., Capture of organic vapors using adsorption and electrothermal regeneration. *Journal of Environmental Engineering-ASCE* 2004, 130 (3),258-267.

Sullivan, P. D.; et. al., Activated carbon fiber cloth electrothermal swing adsorption system. *Environmental Science & Technology* 2004,38 (18), 4865-4877.

Sullivan, P. D.; et. al., Adsorption and electrothermal desorption of hazardous organic vapors. *Journal of Environmental Engineering-ASCE* 2001,127 (3),217-223.

US 8,940,077 B2

INDIRECT REAL-TIME MONITORING AND CONTROL OF ELECTRICAL RESISTIVELY HEATED ADSORBENT SYSTEM

PRIORITY CLAIM AND REFERENCE TO RELATED APPLICATION

The application claims priority under 35 U.S.C. §119 from prior provisional application Ser. No. 61/604,618, which was filed on Feb. 29, 2012. This application is also a continuation-in-part of and claims priority under 35 U.S.C. §120 from application Ser. No. 12/827,630, now U.S. Pat. No. 8,500,853, which was filed on Jun. 30, 2010, which claimed priority from provisional application Ser. No. 61/266,789, which was filed on Dec. 4, 2009.

STATEMENT OF GOVERNMENT INTEREST

This invention was made with government support under Grant No. CBET 12-36203 awarded by National Science Foundation. The government has certain rights in the invention.

FIELD

A field of the invention is sorption and desorption systems that use electrically heated activated adsorbent elements, such as activated carbon fiber cloth (ACFC) elements. In general, the invention is applicable to systems including unified adsorbers that can be heated electrically (e.g., ACFC and monolithic adsorbers). Example applications of the invention include to adsorbate removal systems that process gas streams from other processes.

BACKGROUND

Rood et al. U.S. Pat. No. 6,364,936, incorporated by reference herein, provides for selective sorption and desorption of gases with an electrically heated ACFC element. In the '936 patent, an adsorption/desorption unit includes a hollow enclosure containing one or more elongated hollow elements of ACFC of appropriate length to cross sectional area to provide suitable electrical resistance for heating. The elements conduct electrical current to heat to a temperature that permits selective adsorption of a gas stream constituent and subsequent desorption to recover a sorbate. An enclosure houses the ACFC elements and is arranged to direct gas stream flow through the elements and into and out of the enclosure via gas ports. The ability to heat the elements to a desired temperature by electrical current flow allows for straightforward implementation of selective adsorption. After an adsorption cycle, altering the temperature of the element or elements enables desorption. A thermocouple is used to monitor temperature of the ACFC in the enclosure. In a particularly preferred embodiment, the enclosure with the element also includes a liquid condensate outlet and liquid sorbate is directly recovered as liquid from the same unit used for adsorption and desorption.

Rood et al. U.S. Pat. No. 8,080,095, incorporated by reference herein, provides a steady state tracking desorption system and method. In the '725 application, a steady state tracking desorption system achieves steady tracking of either a fixed sorbate output set point, or a set point that changes over time. The system includes an electrically heated thermal adsorption/desorption device. A temperature sensor, such as a thermocouple, senses the temperature of an adsorbent material within the adsorption/desorption device. A sorbate sensor, such as a hydrocarbon sensor, senses a sorbate concentration from an outlet of the adsorption/desorption device. A power sensor senses the power supplied by the desorption device. A controller interprets levels sensed by the temperature sensor, the sorbate sensor and the power sensor and provides a signal to achieve steady set point tracking of a sorbate concentration from the outlet of the adsorption/desorption device.

Rood et al. U.S. Patent Application 20110132031, incorporated by reference herein, now U.S. Pat. No. 8,500,853, provides gas purification methods and systems for the recovery and liquefaction of low boiling point inorganic and organic gases, such as $CO_2$, $NH_3$, chlorofluorocarbons, methane, and propane. Low boiling point gases are adsorbed with activated carbon fiber material during an adsorption cycle. During a desorption cycle, the activated carbon fiber is heated to a temperature to regenerate the fibers and generate a gas stream enriched with the low boiling point gases. This desorption gas stream is actively compressed and/or cooled to condense and liquefy the low boiling point gases. These methods and systems can provide recovery and liquefaction of low boiling point inorganic and organic gases, such as $CO_2$, $NH_3$, chlorofluorocarbons, methane, and propane. The low boiling point gases can be collected, stored, re-used, sold, etc.

Optimizing performance of ACFC thermal swing systems like those discussed above requires accurate monitoring of the temperature of ACFC cartridges during adsorption and desorption cycles. This is accomplished in the above patents with a temperature sensor, such as a thermocouple, that directly contacts the ACFC cloth.

The parent of the present application, directed toward the recovery of low boiling point gases, also uses thermocouples for temperature sensing. However, the parent of the present application also discloses using resistance measurement to determine the temperature during the desorption cycle when electrical power is being applied to heat the ACFC. This is disclosed, for example, in [0023] of US Patent Application 20110132031. The resistance based sensors functions well and reduce the need for direct temperature sensors, e.g., thermocouples, that are attached to the adsorbent. As discussed in [0094] of the '031 published application, thermocouples can provide incorrect values, and fail due to aging or required maintenance operations. Such thermocouples can be damaged during resistive heating for regeneration.

Commercially used systems typically use beds that are not electrically heated, which provides less control than the above Rood et al. devices, and also have additional drawbacks compared to the above discussed systems often require downstream sensing to determine when regeneration or replacement of adsorption material is necessary, or when destruction equipment must be adjusted. All known commercial systems known to the inventors that use different types of adsorbents and adsorbent heating processes also use downstream hydrocarbon sensors.

Various systems are commercially in use in a wide variety of manufacturing industries to reduce emissions of volatile organic compounds (VOCs). Environmental control devices, such as thermal oxidizers or vessels containing granular activated carbon (GAC) are examples. Thermal oxidizers require costly auxiliary fuel and convert VOCs to $H_2O$, $CO_2$, and $NO_X$. GAC allows for capture and recovery of VOCs, but GACs are known to ignite during adsorption cycles when treating a wide range of VOCs such as ketones. Non-regenerable GACs also require additional cost for replacement and disposal of the saturated adsorbent, which is often categorized as a hazardous waste. Capture and recovery of these VOCs for reuse without costly ignition issues reduces atmospheric emissions and improves air quality while providing feedstock for reuse reducing manufacturing cost and conserving materials.

Various sensors in the above discussed oxidizer, ACFC and GAC systems can be expensive and require frequent maintenance. Direct temperature (i.e. thermocouples) sensors used in ACFC systems can fail. For example, thermocouples in contact with an adsorbent have been shown to periodically fail from loss of adsorbent contact and from shorting the electrothermal regeneration circuit resulting in burning of the thermocouples and ACFC, which can necessitate repairs and reduced system operating time.

Hydrocarbon sensors used with adsorption and thermal oxidizer systems can also fail. The hydrocarbon sensors used in the adsorption and thermal oxidizer systems are expensive (>$10K), require weekly calibration, and periodically fail. For example, infrared hydrocarbon sensors that operate with GAC control devices used for aircraft coating operations at Hill Air Force Base (HAFB), Utah typically fail after 2-4 months of operation.

The general cycles in the various systems include adsorption, regeneration, and cooling cycles. Adsorption and regeneration cycles are typically controlled based on measurements from hydrocarbon sensors, which requires their initial purchase, maintenance, and periodic calibration. Other systems also use local temperature sensors (e.g., thermocouples) to control electrothermal heating during regeneration cycles and to determine when a cooling cycle is complete.

Patents and publications concerning bed-based GAC have used direct contact local resistance to measure loading. For example, Puskas, U.S. Pat. No. 6,593,747 discloses a system that uses a packed bed of carbon particles. Local conductivity measurements are taken with pairs of opposing electrodes that are immersed in the packed bed. The local conductivity measurements are correlated to local saturation of the packed bed. The same technique is also disclosed by Puskas, Del Vecchio, et al., "New Method for Monitoring of Adsorption Column Saturation and Regeneration I. Demonstration of the Measurement Principle," Chemical Engineering Science 59 2389-2400 (2004). Similarly, N.D. Del Vecchio, Puskas and Barghi, "New Method for Monitoring of Adsorption Column Saturation and Regeneration I. Demonstration of the Measurement Principle," Chem. Eng. Comm., Vol. 189(3), pp. 352-71 (2002), discloses measurement of the resistance of the local area in a packed bed of adsorbent particles between two parallel plates that contact the particles.

Selective adsorbent activity characterization in the prior work discussed in the previous paragraph shows a change in electrical resistance measured locally with direct contact to a packed adsorbent bed that occurs during adsorption, which can be used to determine the end of an adsorption cycle and when regeneration of the adsorbent is complete. This process, in addition to requiring direct electrical contact with a packed bed, fails to account for dependence of resistance on temperature. It is therefore limited to systems that operate at constant temperature and cannot be utilized for commonly used thermal swing adsorption systems (e.g., electrothermal swing adsorption (ESA) system), which are typically more cost efficient for treating gas streams with high flow rates (>few thousand $m^3$/hr). This relationship between electrical resistance and adsorbed mass at constant temperature has also been previously described by others. See, R. Haines, R. S. Benson, G. C, "The effect of physical adsorption on the electrical resistance of activated carbon" Journal of Chemical Physics, 15, (1), 17-27 (1946).

ACFC is known to act as a typical semiconductor at relevant adsorbent temperatures (20-200° C.), such that resistance decreases as temperature increases. Electrical current and voltage measurements are typically required and used for electrothermal heating in known devices.

SUMMARY OF THE INVENTION

The present inventors have determined that accuracy of condition monitoring and control of ESA adsorption systems like those discussed can be enhanced. The invention accounts for change in resistance of a unified adsorbent from changes in adsorbed mass during adsorption, regeneration, and cooling cycles and the simultaneous change in resistance that occurs when the adsorbent's temperature changes during these cycles, and thus can be utilized for any non-isothermal or thermal swing adsorption system.

An embodiment of the invention is a method for indirectly monitoring and controlling an electrically-resistive heated adsorption system. Adsorption of a predetermined adsorbate is conducted while indirectly monitoring electrical resistance of a unified adsorbent element. Breakthrough is predicted based upon the indirectly monitored electrical resistance and a previously acquired mass loading relationship between the resistance of the unified adsorbent element and the loading of the unified resistance element with the predetermined adsorbate. Adsorption is halted before the predicted breakthrough. The adsorbent element is regenerated. It is then cooled while indirectly monitoring temperature of the unified adsorbent.

Preferred systems of the invention include a unified electrically heated adsorption element. Adsorption, regeneration and cooling cycles are controlled by a controller without any measurement of the element using characterizations of mass loading and temperature. Systems of the invention can have no sensors that contact the adsorbent element, or that are in an adsorption vessel, and can also avoid downstream adsorbate sensors.

DETAILED DESCRIPTION OF THE PREFERRED EMBODIMENTS

Figure 1A:
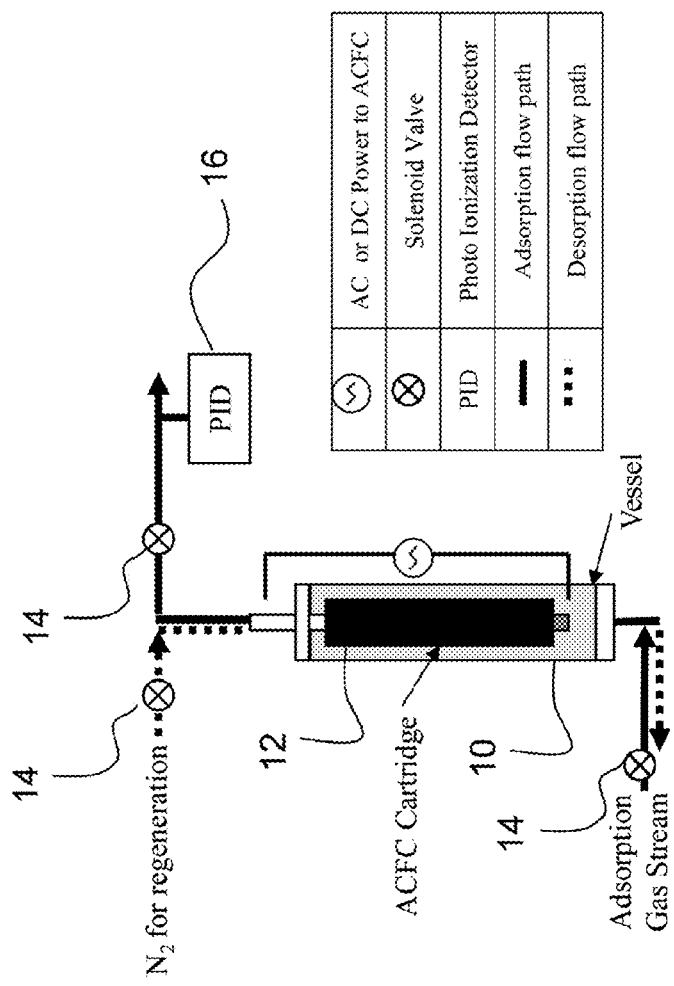
FIGS. 1A and 1B show an example ACFC cartridge based adsorbate removal system that can implement an indirect monitoring and control method of the invention.

Embodiments of the invention provide an ESA system that selectively removes vapors and gases from carrier gases to effectively dispose of them or recover them as feedstock. Systems of the invention avoid reliance upon sensors that contact the absorbent and/or gas sensors that are used downstream of the device (e.g. PID) and can determine data required for operation so that complete adsorption, regeneration, and cooling cycles can be controlled and monitored simply and indirectly. Methods of the invention permit determination of the mass of the captured adsorbate in real-time during the adsorption and regeneration cycles with indirect measurements. The system uses an adsorbent element or elements that are unified. The overall electrical resistance to adsorbent loading of each and/or all of the adsorbent element(s) for an adsorbent of interest is determined in advance.

Unified adsorbent elements include, for example, ACFC and monolithic adsorbent elements. These examples can also be considered to be rigid. The ACFC cartridges in the Rood et al. patents and patent applications discussed in the background provide example of ACFC cartridges locating in adsorption vessels. A unified adsorbent element or group of elements can have its overall total resistance measured indirectly through voltage and current meters that monitor power between a power source and the unified adsorbent element(s). The meters do not contact the adsorbent element(s). In preferred embodiments having an adsorption or plurality of adsorption vessels each with an adsorption or plurality of adsorption elements, there are no sensors within the vessel. Temperature and loading is determined solely from indirect determination of total resistance of adsorbent element(s) within a vessel from voltage and current measurements taken outside of the vessel. The adsorbent loading and temperature to electrical resistance relationship for the element(s) is predetermined (through testing or calculations).

In preferred embodiments, complete adsorption, regeneration, and cooling cycles are controlled based on measurements from a remote ammeter and a remote voltmeter that are used to calculate electrical resistance and applied power without any input from direct contact thermocouples or hydrocarbon sensors. There are no temperature or electrical sensors that contact the unified adsorbent elements. Required electrical measurements can be taken from conductive supports that are in electrical contact with the adsorbent element(s), contact that is preferably made outside of the adsorption vessel. There are no temperature or electrical sensors within an adsorption vessel. Actual meters for voltage and current are not touching the adsorbent and can be located away from the adsorbent and its vessel. However, they need to be attached to an electrical conducting circuit that includes the adsorbent. There are no downstream adsorbent sensors.

Methods of the invention can be safe, simple and relatively inexpensive. Methods of the invention are automatically controlled throughout all cycles and breakthrough is predicted so that regeneration can commence so that no or only tolerable trace amount of adsorbent passes through the vessel prior to the commencement of regeneration. The prediction of breakthrough is based on feedback from indirect sensing of the voltage applied across the adsorbent and the current flowing through the adsorbent. Embodiments of the invention do not require sensors such as hydrocarbon detectors or thermocouples that are in direct contact with the adsorbent. Resistance and temperature are also determined indirectly during cooling and adsorption cycles via application of small power to the adsorbent element(s), which allows the controller to commence each and every cycle necessary to conduct an efficient adsorbent recovery operation.

Adsorbents that are captured and recovered include valuable adsorbents that can be recycled into a process from which the input stream for treatment was received, or into another process. Adsorbents can also include contaminants that are recovered and stored or destroyed in a manner that complies with good environmental and economic practices.

In methods of the invention, electrical resistance of the adsorbate is calculated from measured current and voltage to detect the cumulative amount of adsorbed mass and temperature during an adsorption cycle. The change in electrical resistance during an adsorption cycle allows for real-time monitoring of this adsorbed mass and prediction of breakthrough. In preferred embodiments, an adsorption cycle includes applying a small amount of power to unified adsorption element(s) during adsorption. The amount of power is low enough to avoid essentially any heating of the element(s), but permits the indirect measurement of resistance during adsorption, determination of the adsorbed mass, and prediction of breakthrough. A regeneration cycle is commenced prior to breakthrough and the unified adsorption element(s) are electrothermally heated based on electrical resistance feedback. Heating is ended once a specified power (calculated from measured current and voltage) limit is reached. The mass that is desorbed is determined real-time by comparing the measured power to the power profile acquired from preliminary testing (for a particular adsorption element(s) and adsorbate configuration), which involved heating the adsorbent before any vapors or gases were adsorbed. The preliminary test can be conducted on the actual device being used, or can be based upon devices that are sufficiently identical to validate the resistance to temperature and mass loading relationships that are used during operation. A cooling cycle is also monitored indirectly with application of power that produces essentially no heating and the temperature is accurately determined from predetermined resistance to temperature relationship for the element(s). The cooling cycle is ended when a specified electrical resistance value is reached, which eliminates the need for temperature measurement devices. Once the cooling cycle is complete, an adsorption cycle begins and the process repeats without requiring any inputs from temperature or hydrocarbon sensors. This method can be applied for thermal swing adsorption systems having unified adsorbent element(s) that can be heated electrically. Example unified adsorbent elements that are also rigid and that can be heated electrically include ACFC cloth, ACFC cloth cartridges, and monolithic adsorbents.

Embodiments of the invention provide a simple, safe, low maintenance and low cost process to monitor and control systems that determined adsorption and desorption cycles. The invention is particularly useful in systems like those disclosed in the Rood et al. patents discussed in the background and that are incorporated by reference herein. Embodiments of the invention are based on indirect electrical measurements, which eliminate the need for hydrocarbon sensors, local resistance sensors that are embedded in the adsorbent and local temperature sensors. In preferred methods of the invention an ESA system is controlled through adsorption, regeneration, and cooling cycles using only indirect electrical measurements. An entire ESA method is provided that does not require any hydrocarbon or local/embedded temperature sensors. In methods of the invention adsorbed mass and its affect on electrical resistance of an adsorbent is considered during control.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

In preferred methods of the invention, the electrical resistance of an adsorbent is considered to determine adsorbed mass in an adsorbent along with the adsorbent temperature and execute a control strategy for adsorption, desorption and cooling in the absence of any other information. Specifically, no direct temperature or hydrocarbon (in general gas detector) measurements are used. Methods and systems of the invention operate adsorption, regeneration, and cooling cycles that are controlled entirely based on indirect electrical resistance measurements eliminating the need for thermocouples and hydrocarbon sensors. Methods of the invention provide prediction of breakthrough before it occurs during an adsorption cycle.

Methods of the invention are based upon a recognition that adsorption of VOCs (or other adsorbents) onto ACFC (or other unified adsorber) will influence the electrical resistance and that the overall resistance, loading and temperature of an adsorber element can be indirectly determined to control an adsorption cycle, predict breakthrough, commence and end regeneration, and monitor cooling, and recommence adsorption. The amount of decrease in electrical resistance will depend upon the mass adsorbed and the number of electron donors in the adsorbate. While others have previously recognized that the local resistance in packed carbon beds can be directly measured and that resistance is related to mass loading, methods of the invention are based upon characterizing unified adsorption element(s) as a whole.

It has been known that electrical resistance can increase, decrease, or initially increase and then decrease during an adsorption cycle For example, activated carbon resistance decreased by 3.1% and increased by 0.9% after adsorption of isobutane and ethylene oxide, respectively in published experiments. The decrease in resistance during hydrocarbon adsorption is proportional to the number of carbon atoms in the adsorbate.

The relationship between adsorbed mass and electrical resistance was demonstrated in experiments with ACFC cartridges and, unlike prior research, the entire adsorption element (in this case an ACFC cartridge) was characterized sufficiently (in bench scale) to permit complete indirect monitoring and control. The effect that adsorbed mass has on electrical resistance is used along with resistance to accurately estimate temperature that can therefore characterize and be used in real-time to control an ESA system, which involves simultaneous mass and heat transfer.

The real-time adsorbed mass ($M_A$) during an adsorption cycle is determined as follows:

$$M_A = \sum_{k=0}^{n} M_W \frac{PQx_{iso}(t_{k+1} - t_k)}{RT} \quad \text{(Eq. 1)}$$

where $M_W$=molecular weight of adsorbate (g/mol), P=ambient pressure (atm), Q=flow rate of adsorption gas stream at ambient temperature and pressure (LPM), $x_{iso}$=the mole fraction of isobutane in the gas stream assuming 100% capture efficiency, $t_k$=time (min), $$R = \text{ideal gas law constant} \left(\frac{\text{atm} \cdot L}{K \cdot \text{mol}}\right),$$

and T=ambient temperature (K). The total energy from the heat of adsorption ($E_A$, J) during an adsorption cycle is determined as follows:

$$E_A = \sum_{k=0}^{n} \frac{\Delta H_S M_A}{M_W} \quad \text{(Eq. 2)}$$

where $\Delta H_s$=the isosteric heat of adsorption (kJ/mol). The total energy consumption ($E_{EH}$, kJ) for electrothermal heating can determined by integrating the applied power over the desorption cycle:

$$E_{EH} = \Sigma_{k=0}{}^{n} IV(t_{k+1} - t_k) \quad \text{(Eq. 3)}$$

where I=RMS current (A) and V=RMS voltage (V). The total additional energy required to heat and desorb the captured adsorbate can be determined real-time by subtracting the cumulative energy consumption when heating ACFC without adsorbate from the cumulative energy consumption when heating ACFC with adsorbate. For this method, we assume that the heat capacity of the desorbed material in the gas stream has a negligible effect compared to the heat of adsorption. The total real-time desorbed mass during desorption ($M_D$, g) can then be predicted as the product of the additional energy for desorption (with adsorbate present) and the molecular weight of the adsorbate divided by the isosteric heat of adsorption by combining this cumulative energy difference with Eq. 2 and Eq. 3:

$$M_D = \frac{M_W}{\Delta H_S} \sum_{k=0}^{k} (I_A V_A - I_o V_o)(t_{k+1} - t_k) \quad \text{(Eq. 4)}$$

where $I_i$=RMS current (A) and $V_i$=RMS voltage (V) for ACFC with condition i where i=A is ACFC with adsorbate and i=o is ACFC without adsorbate. The above factors can be used for accurate controlling of adsorption, desorption and cooling cycles to maximize performance. In experiments that were conducted, the ACFC without adsorbate was electrothermally heated with the same control algorithm so it was assumed that the additional energy for heating is attributed to heating and desorption of the captured adsorbate.

Experiments

The experiments demonstrate a method to indirectly monitor and control ACFC-ESA of VOCs that involves using existing remote electrical current and voltage measurements to determine the ACFC's temperature and provide real-time monitoring of adsorbed and desorbed mass based on these electrical properties. This method does not require direct temperature or hydrocarbon sensors reducing system capital and operating costs, and increasing simplicity, safety, and run time by eliminating the failures associated with each sensor In experiments, the ACFC unified adsorbent element's electrical resistance was initially characterized based on adsorbent temperature and amount of adsorbed organic gas (i.e., isobutane). This relationship was utilized to develop control logic to monitor and control ESA cycles based on resistance and applied power values. The resistance measurements were then used to predict breakthrough during adsorption cycles and automatically terminate those cycles. Electrothermal heating was performed based on resistance values and applied power values were used to detect adsorbed mass desorption to determine the end of regeneration cycles. The electrical resistance was also used as a temperature sensor to determine the end of cooling cycles. Three continuous sets of adsorption, regeneration, and cooling cycles were then performed sequentially based entirely on indirect electrical measurements fully demonstrating a cyclic ESA process that does not require any downstream adsorbate sensors, e.g., hydrocarbon sensors, or local temperature sensors.

ESA Apparatus

Figure 1B:
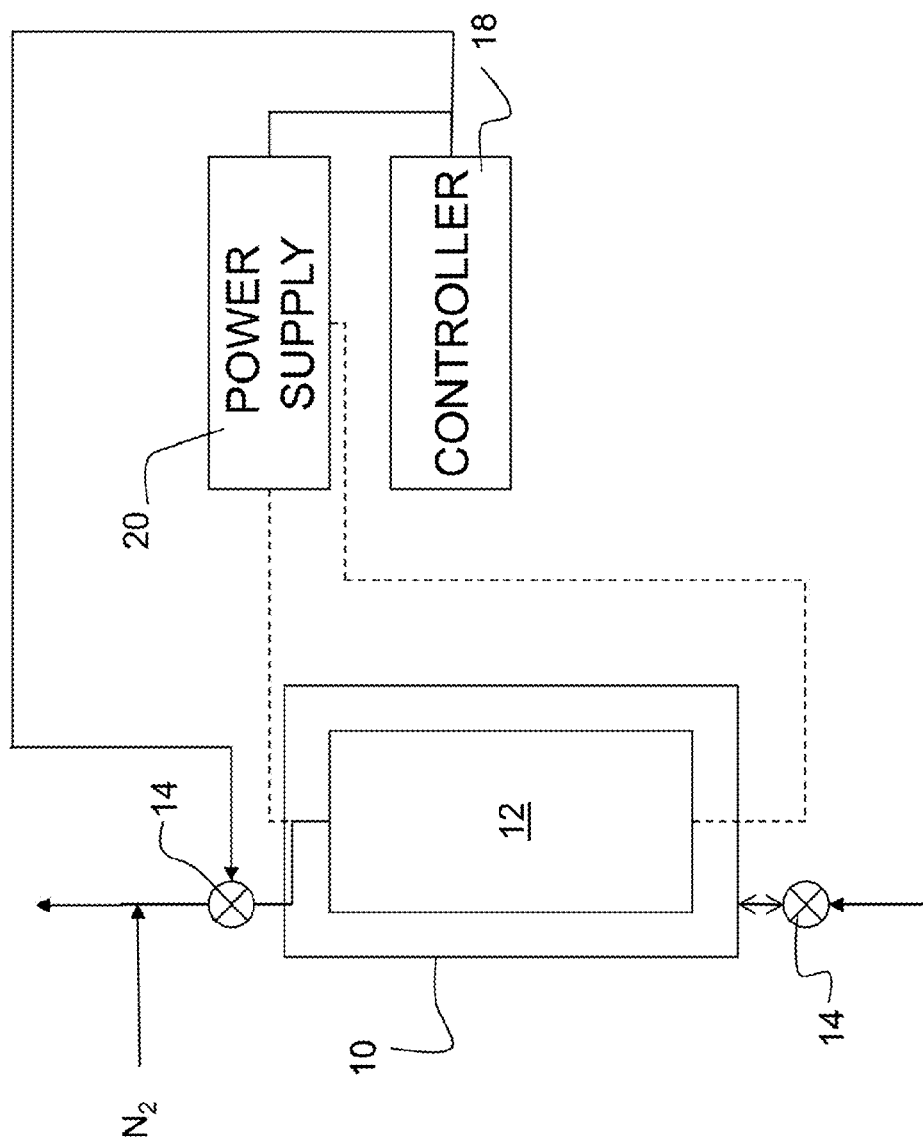

The specific test apparatus was constructed in small scale and is shown in FIG. 1A. A vessel 10 included an ACFC cartridge 12 therein. Valves 14 control adsorption and regeneration flows. A photoionization detector 16 was used downstream in the clean output path to verify effectiveness of control of the invention, but would not be used in preferred methods of the invention. FIG. 1B shows a preferred embodiment system of the invention which does not use any direct temperature measurements or downstream hydrocarbon measurements. The controller 18 includes a predetermined profile that accounts for mass loading of a predetermined adsorbate to be adsorbed. Without any direct sensors, the controller 18 controls a power supply 20 during all cycles including adsorption, regeneration and cooling cycles. Current (I) and voltage (V) are measured based on V=IR and are used to obtain resistance (R) and power (P)=IV is used to obtain power. A small voltage is used during adsorption and cooling cycles to be able to make current and voltage measurements. Voltage is controlled during regeneration cycles to achieve a resistance set-point and power is measured. While a single vessel with a single ACFC cartridge as the unified adsorbate element is shown, the process can be made continuous with the use of additional vessels so that one or more additional vessels are conducing adsorption while a first vessel is being regenerated.

Figure 1C:
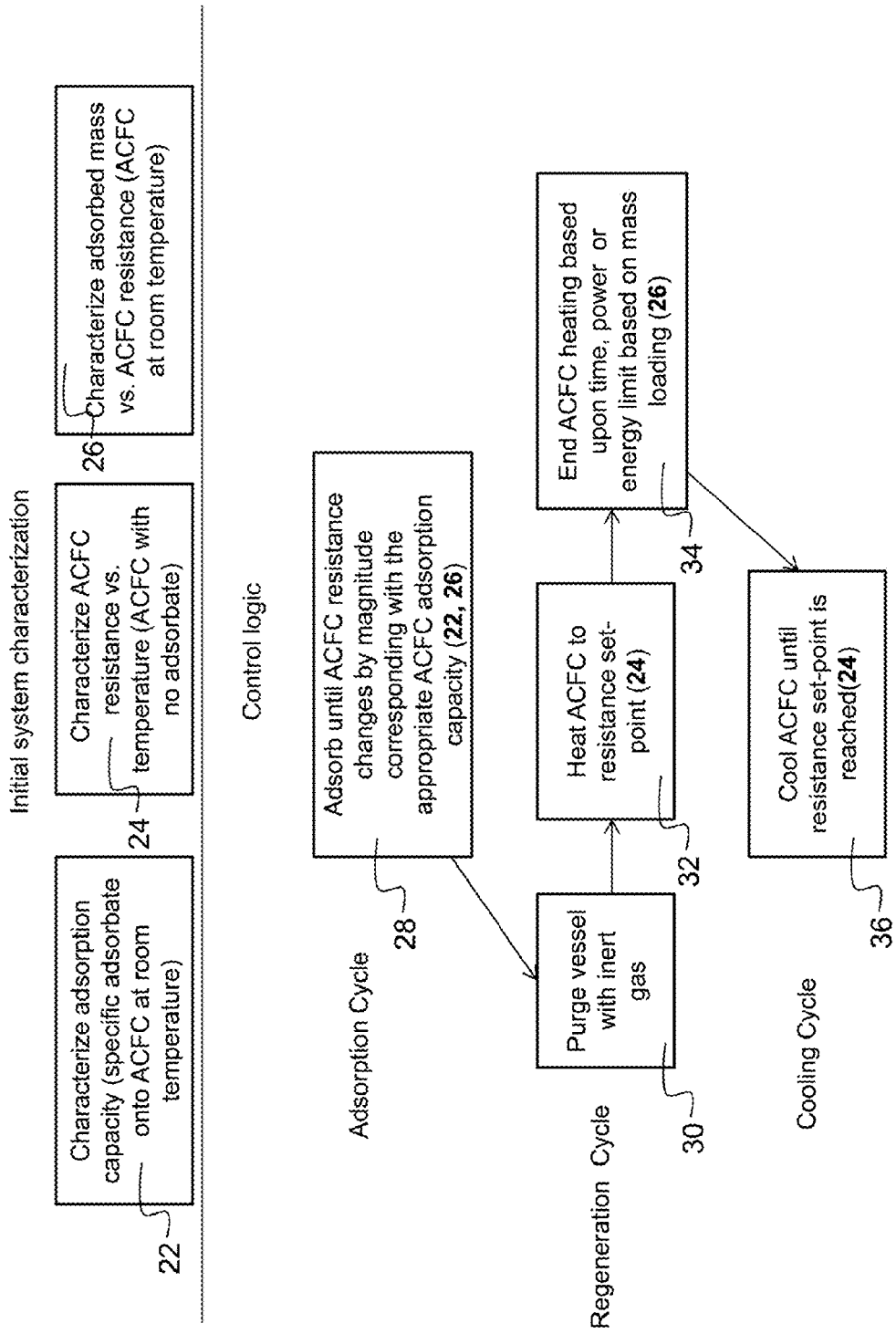
FIG. 1C illustrates characterization and control utilized in preferred indirect monitoring and control logic.
Figure 1D:
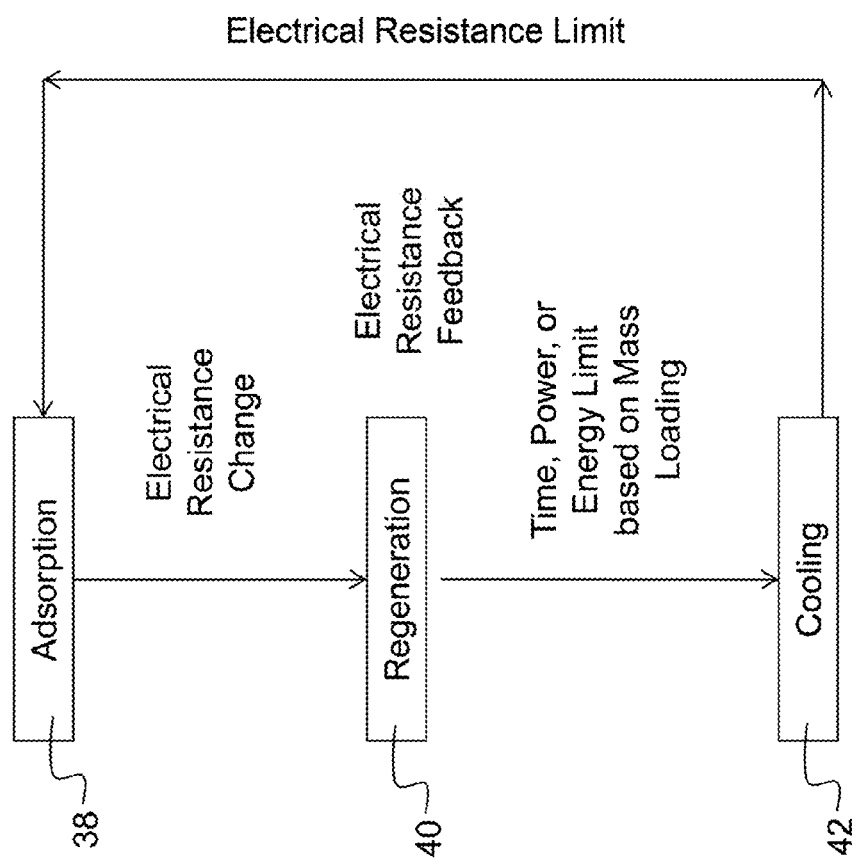
FIG. 1D illustrates a complete control cycle and the indirect measurements used in a preferred method of the invention.

The unified adsorbent, e.g. an ACFC cartridge as in the experiments, is first characterized for an adsorbate of interest and then the control parameters can be established for the controller 18. FIG. 1C illustrates preliminary characterization and then the resultant control for adsorption, regeneration, and cooling cycles. FIG. 1D illustrates the indirectly determined parameters used for control in a preferred method of operation by the controller 18. Three preliminary characterization steps 22, 24 and 26 are carried out on an actual unified adsorbent or sufficient corollary (such as a scaled model) for an adsorbate of interest. The adsorption capacity is determined for the specific adsorbate 22, which can be carried out at room temperature or the expected temperature during an adsorption phase. The resistance versus temperature with no adsorbate is determined 24. The adsorbed mass vs resistance is also determined 26. An adsorption cycle is conducted until resistance changes to indicate that capacity would be reached, in advance of breakthrough. The resistance is measured indirectly, by sensing the voltage and current externally while having the power supply 20 apply a small amount of power that produces essentially no heating of the adsorbent. The breakthrough can be predicted with information from 22 and 26. During regeneration, the vessel is first purged 30 with $N_2$ or other inert gases and then heating is conducted 32 by applying electrical power up to a resistance set point determined in 24. The ACFC heating is ended 34 after the power application reaches the steady state power required to heat ACFC with no adsorbate or an amount of power that is needed to desorb adsorbate has been applied (described in paragraphs 0043-0051). A time limit could also be used, as having been determined in advance, which would require no measurements to end regeneration. Cooling is conducted 36 with measurement of the resistance indirectly via the application of the small amount of power to an acceptable resistance set point determined in 24. The cycles for a preferred three phase control are summarized in FIG. 1D. The entire control is conducted without any direct measurements in the vessel and without any downstream adsorbate dectectors. The adsorption cycle 38 indirectly monitors electrical resistance change to predict breakthrough. Regeneration 40 includes heating to reach an indirectly monitored resistance (indicative of desired temperature based upon preliminary characterization for adsorbent with adsorbed material) and then continues until time, energy or power is met. The energy or power are determined with indirect measurement of resistance and/or voltage and current applied over time. Cooling 42 is continued until indirectly measured resistance indicates that a desired temperature for adsorption has been reached.

Figure 1E:
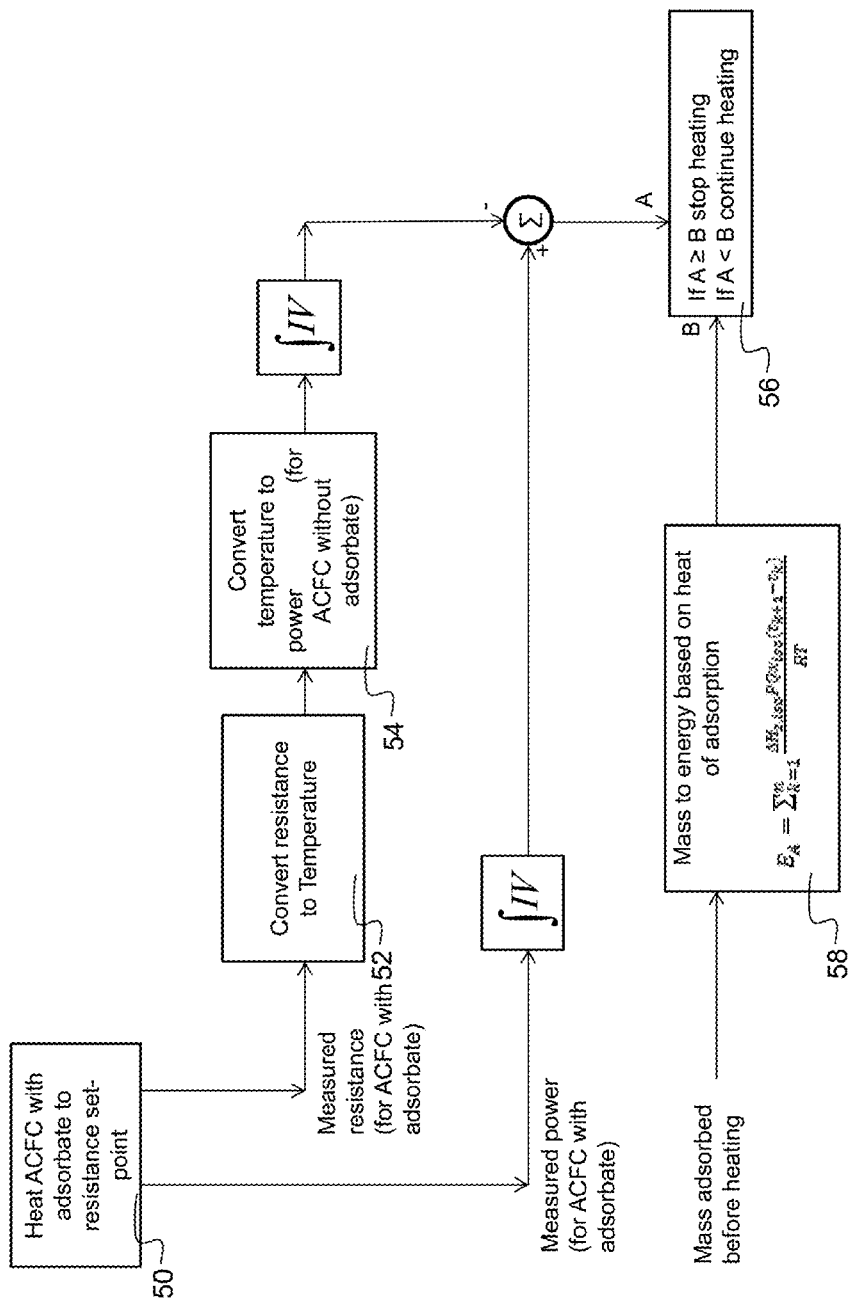
FIG. 1E illustrates an indirect power measured controller operation to determine the end of a regeneration cycle.

The regeneration heating can be ended when the applied power for a given resistance set point reaches a level that indicates adsorbent that is free of adsorbate or at a predetermined minimum level. The regeneration heating can also be ended based on predicting the mass that is desorbed based on the resistance and power measurements during the regeneration cycle, which is illustrated in FIG. 1E. Heating to the desorption temperature 50 is conducted. Preliminary characterizations of resistance to temperature 52 and temperature to power 54 are required. See, Sullivan, P. D.; Rood, M. J.; Grevillot, G.; Wander, J. D.; Hay, K. J. (2004) Activated carbon fiber cloth electrothermal swing adsorption system. *Environmental Science & Technology,* 38 (18), 4865-77. The power preliminarily measured without adsorbate is subtracted from the power indirectly measured with adsorbate 56 and compared to the mass to energy gained 58 that has been calculated for the adsorber.

Experiments implemented an indirect control method of the invention. For all experiments, a 50 SLPM gas stream containing 2,000 ppm, isobutane was directed into the vessel until breakthrough was detected as measured with a hydrocarbon detector (photo ionization detector) or a specified change in electrical resistance occurred. After breakthrough, the vessel was purged of $O_2$ with 15 L $N_2$ at 5 SLPM. The $N_2$ was then reduced to 0.5 SLPM and feedback controller was activated to heat the ACFC. The controller was designed with computer software and controlled DC voltage to a silicon controlled rectifier (SCR), which supplied up to 120 V AC that was then reduced with a variable voltage transformer (Variac) and applied to the ACFC for heating. Direct contact Type K thermocouples (0.081 cm diameter) measured ACFC temperature during heating. Root mean square (RMS) voltage and RMS current applied to the ACFC were measured with a potentiometer and a current transformer connected to an ammeter, respectively. A small voltage (<1 V AC) was applied to the ACFC during adsorption and cooling cycles that occurred after regeneration cycles to maintain a constant current through the ACFC to allow for calculation of resistance. Voltage and current were measured and used to calculate resistance. During cooling cycles the external wall of the vessel was convectively cooled with a fan (14 cm diameter blades). All measurements were continuously stored at 1 Hz with data acquisition hardware.

Cyclic ESA Method

Cyclic ESA involves sequential operation of adsorption, regeneration, and cooling cycles. For all experiments, the adsorption cycle involved passing a 50 SLPM gas stream containing 2,000 ppm, isobutane through the ACFC, which was at ambient temperature (21-26° C.), until breakthrough was detected as measured with a hydrocarbon detector (photo ionization detector as a control test) or the occurrence of a specified change in electrical resistance based upon the indirect resistance measurements obtained with low power levels while applied and voltage and current monitored via a voltmeter and ammeter outside the vessel. With a pre-characterized ACFC cartridge, the experiments show that breakthrough could be predicted. Selection of the resistance value that corresponds to the adsorbed mass is described below, and takes into account the specific adsorbate. After breakthrough, the regeneration cycle was initiated, which involved purging the vessel of $O_2$ with 15 L $N_2$ at 5 SLPM. The $N_2$ was then reduced to 0.5 SLPM and a feedback controller was activated to heat the ACFC. The controller was designed with computer software and controlled DC voltage to a silicon controlled rectifier (SCR), which supplied up to 120 V AC that was then adjusted with a variable voltage transformer (Variac) and applied to the ACFC for heating. After the regeneration cycle was complete, a cooling cycle was initiated that involved reducing the voltage applied to the ACFC (<1 VAC) and cooling the ACFC in the continuously flowing 0.5 SLPM $N_2$ gas stream until the ACFC's electrical resistance reached a value corresponding to 90° C. At this point, the $N_2$ flow was stopped and a 50 SLPM air stream was passed through the ACFC to provide rapid cooling until the ACFC reached a resistance set-point corresponding to ACFC within 1° C. of ambient temperature (22° C.). A small voltage (<1 VAC) was applied to the ACFC during adsorption and cooling cycles to provide a measurable signal for resistance calculations that did not significantly increase the temperature of the ACFC (<0.1° C.). Voltage and current were measured during each cycle and were used to calculate a one minute rolling average of resistance that was used to automatically determine when each resistance set-point was achieved.

Characterizing Adsorption Cycles

Figure 2A:
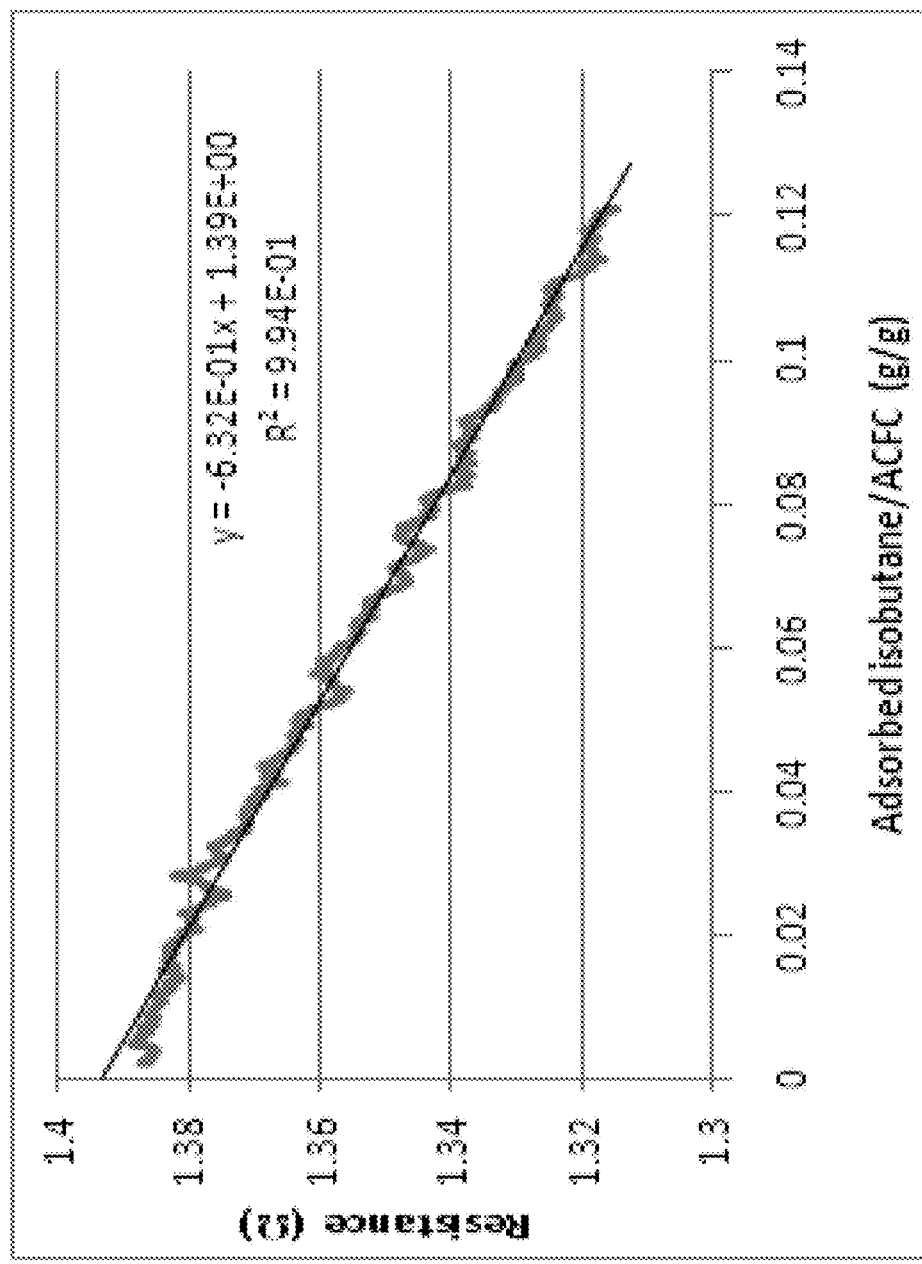
FIGS. 2A and 2B illustrate resistance and adsorbed mass values with an adsorbate of isobutane for a bench scale system that is consistent with FIGS. 1A and 1B.

The initial adsorption cycle began with the ACFC at ambient conditions of 21° C. and the following cycles began once the ACFC cooled to ≤22° C. after regeneration. The average electrical resistance and temperature were recorded, and are shown in FIG. 2A. Electric resistance decreased linearly with duration of the adsorption cycle. The average change in resistance of the ACFC (Ω) per unit loading of isobutane (g isobutane/g ACFC) was −0.632× (i.e., slope of linear regression in FIG. 9 with $R^2$=0.994). These results are indicate that the decrease in resistance of the ACFC at ambient temperature can be used to predict the duration of the adsorption cycle and the amount of adsorbed mass in anticipation of breakthrough.

An initial phase of experiments involved characterizing an adsorbent cartridge for an adsorbate to determine a resistance response to predict breakthrough. In specific detail, ACFC adsorbent used was ACC 5092-15 (American Kynol, Inc.) with an areal density of 176 g/m$^2$, BET surface area of 1,335 m$^2$/g, total pore volume of 0.64 cm$^3$/g, microporosity of 96.6%, and average micropore width of 0.76 nm[8,20]. All adsorption experiments were performed with isobutane in a 1.5 L interior volume Pyrex vessel containing an annular ACFC cartridge as in FIG. 1. Bench-scale measurements are initially performed to empirically determine the necessary characterizations of the entire cartridge for a particular adsorbate. The results are scalable for full-scale system, but each different adsorbate is tested to determine the characterizations. The cartridge was constructed by wrapping a 25×260 cm rectangle (115 g) of ACFC around 1.9 cm outer diameter stainless steel annular electrodes. The ACFC was clamped to the electrodes with steel hose clamps resulting in 22 cm length of ACFC for current to travel through the cartridge. Gas flow rates were controlled with mass flow controllers (air: Aalborg, model GFC571S; isobutane/nitrogen: Tylan).

Gas streams for adsorption cycles were generated by mixing isobutane (Aeropres Corp., 97.8% isobutane, vapor withdrawal) with house compressed air that passed through silica gel and a high efficiency particulate air filter to remove water and particles. Direct-contact Type K thermocouples (0.081 cm diameter) measured ACFC temperature for purposes of verifying experimental control, but would be omitted in preferred systems that execute control methods of the invention. Root mean square (RMS) voltage and RMS current applied to the ACFC were measured with a potentiometer and a current transformer connected to an ammeter, respectively. During all cycles the external wall of the vessel was convectively cooled with a fan (14 cm diameter blades). All measurements were continuously stored at 1 Hz with Labview software and National Instruments hardware.

The ACFC's electrical resistance was characterized during adsorption and desorption at ambient temperatures. Resistance and adsorbed mass values were acquired while passing carrier air (initial clean conditions, FIG. 2B in section A), then carrier air with isobutane (adsorption cycle, FIG. 2B in section B), and then carrier air (desorption into clean air, FIG. 2 in section C) through the ACFC cartridge.

Figure 2B:
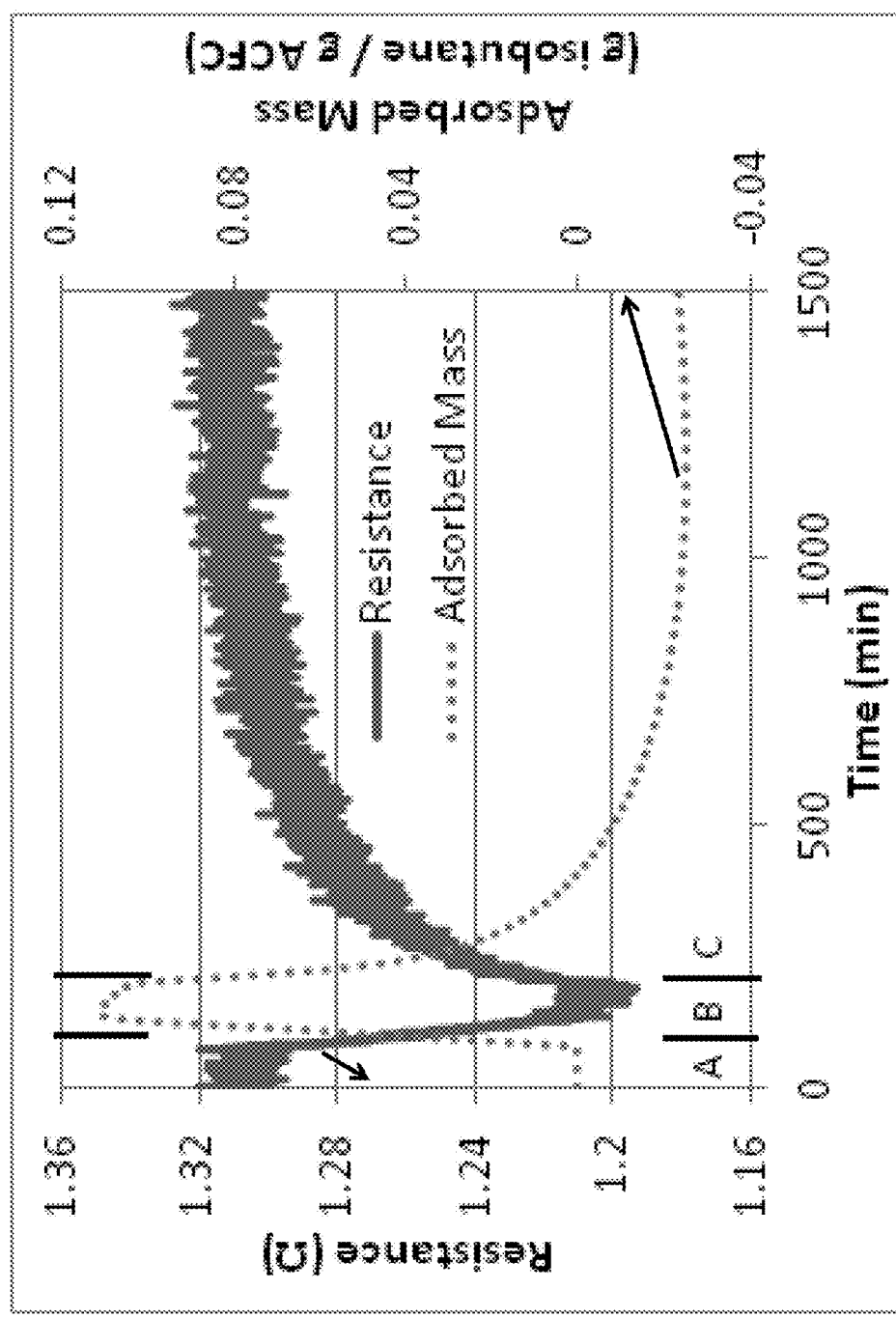

Part A of the data in FIG. 2B was acquired with clean air passing through the ACFC cartridge. When air was initially passed through the cartridge (FIG. 2 in section A) the electrical resistance of the adsorbent remained constant during 80 min with a mean of 1.31Ω and relative standard deviation of 1.2%.

Part B of the data in FIG. 2B shows behavior during adsorption of isobutane. As shown, resistance decreased at 0.86Ω per unit mass of isobutane (g isobutane/g ACFC) with $R^2$=0.97. This demonstrates a strong relationship between adsorbed mass and resistance. As isobutane was desorbed into the air stream, the adsorbent's resistance returned to the initial value with a mean of 1.31Ω and a relative standard deviation of 1.7% during 80 min at t>1400 min (part C). Trends in the adsorbed mass values, calculated based on measurements from a hydrocarbon sensor, were inversely related to the resistance measurements showing consistency between the mass transfer detection methods.

The PID detector downstream proved inaccurate. Calculating adsorbed mass based on the PID sensor resulted in negative values during desorption (500 min). This is unrealistic because the ACFC was thoroughly regenerated before experiments. From this, we determined that the resistance provides a better representation of mass transfer than the direct hydrocarbon measurements.

Figure 3A:
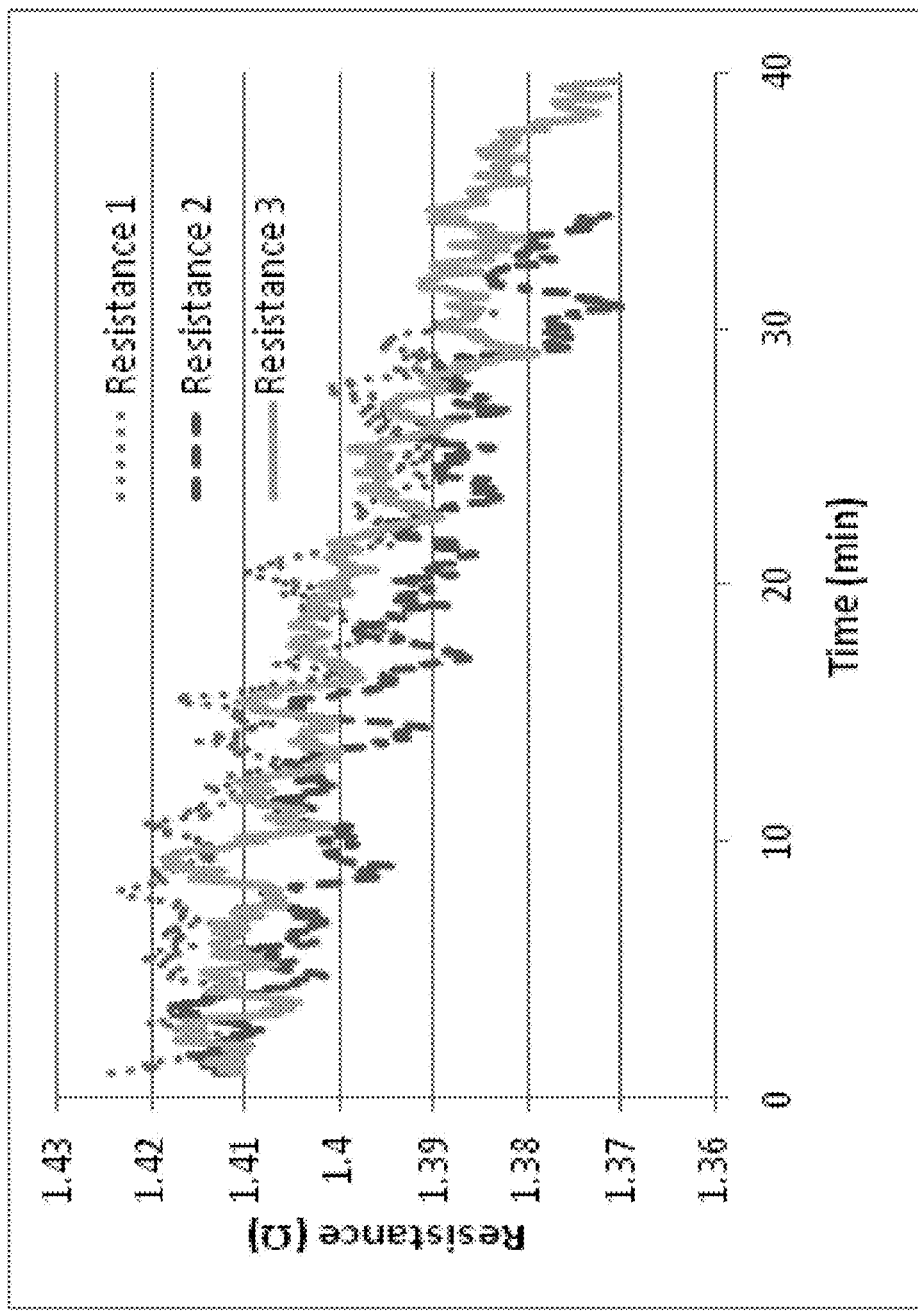
FIGS. 3A and 3B illustrate resistance values and breakthrough values obtained experimentally when ending an adsorption cycle based on indirect resistance measurements for the bench scale system, respectively.
Figure 3B:
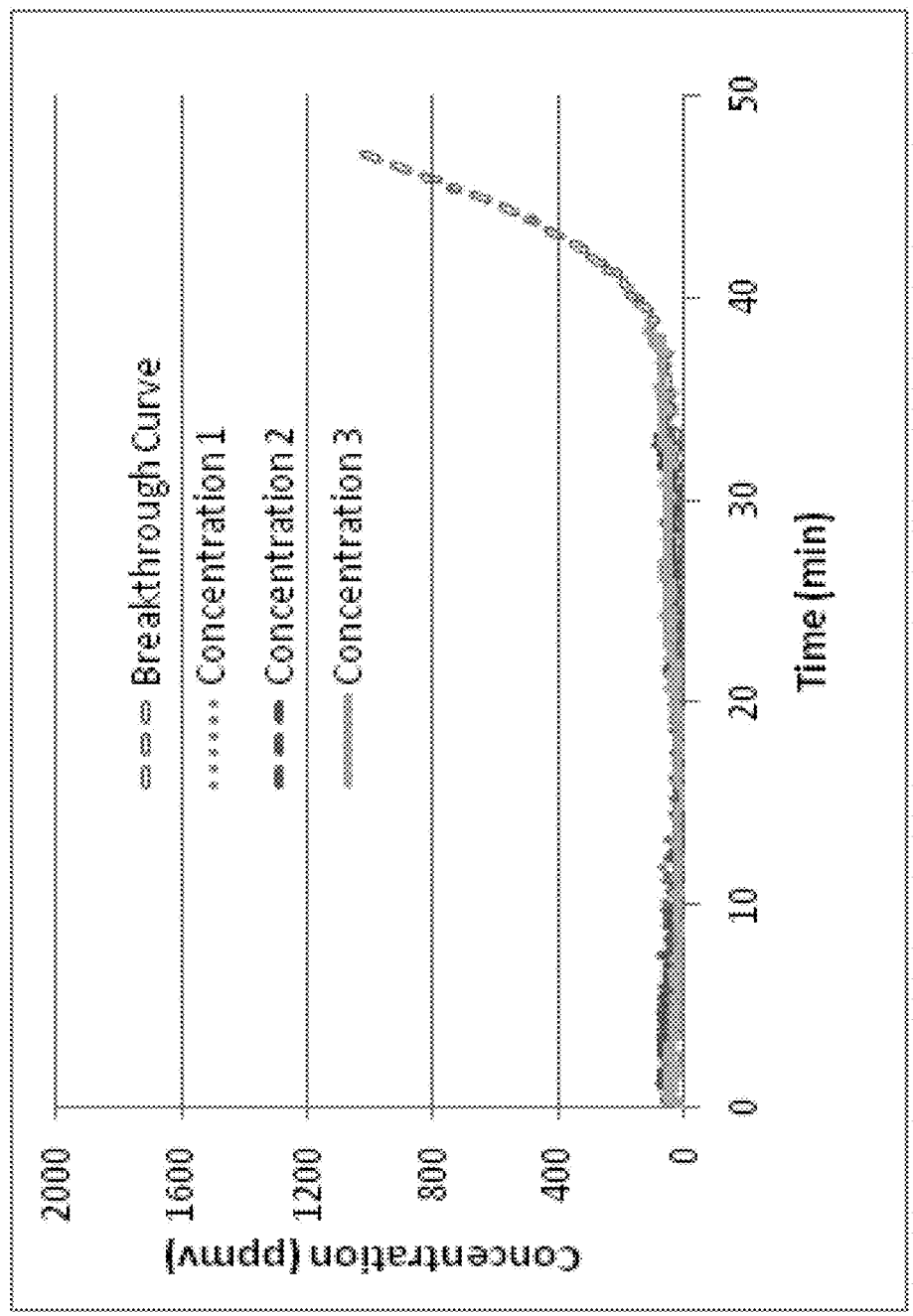

FIG. 3A shows the electrical resistance values that were measured and used for control as follows during adsorption experiments. At the start of the adsorption cycle a one minute average of resistance was stored as $R_{initial}$. The isobutane adsorption cycle was terminated once the average resistance changed by 0.04Ω selected based on FIG. 2 and the outlet isobutane concentration was measured. The average (3 runs) breakthrough percentage (outlet concentration/inlet concentration of isobutane·100) at the end of adsorption cycle was <4% and the average adsorption time was 34.7 min, similar to the 38.8 min to reach 4% breakthrough for the breakthrough curve (concentration 1) with the same conditions, as seen in FIG. 3B. With indirect monitoring and a predetermined resistivity, loading and temperature characterization of the ACFC adsorbent cartridge, the experiments demonstrate that the present invention can automatically control an adsorption cycle based on resistance feedback.

For indirect monitoring, a small amount of power is applied by the power supply to generate a small amount of current and voltage that can be measured externally to the adsorption vessel. The adsorption experiments were performed while controlling the voltage applied to the ACFC to achieve a constant current of 1.5 A, which was a value large enough to achieve stable control of the current and small enough to not increase the temperature of the adsorbent more than 1° C. With constant current maintained, voltage can be calculated as directly proportional to resistance based on Ohms law. At the start of the adsorption cycle a one minute average of voltage was stored as $V_{initial}$. The isobutane adsorption cycle was terminated once the average voltage changed by 0.06 V (corresponding to 0.04Ω, a value selected based on FIG. 2) and the outlet isobutane concentration was measured (FIG. 3B). The average (3 runs) breakthrough percentage ((outlet concentration/inlet concentration of isobutane)*100) at the end of adsorption cycle was <4% and the average adsorption time was 34.7 min.

Characterizing Regeneration Cycles

Figure 4A:
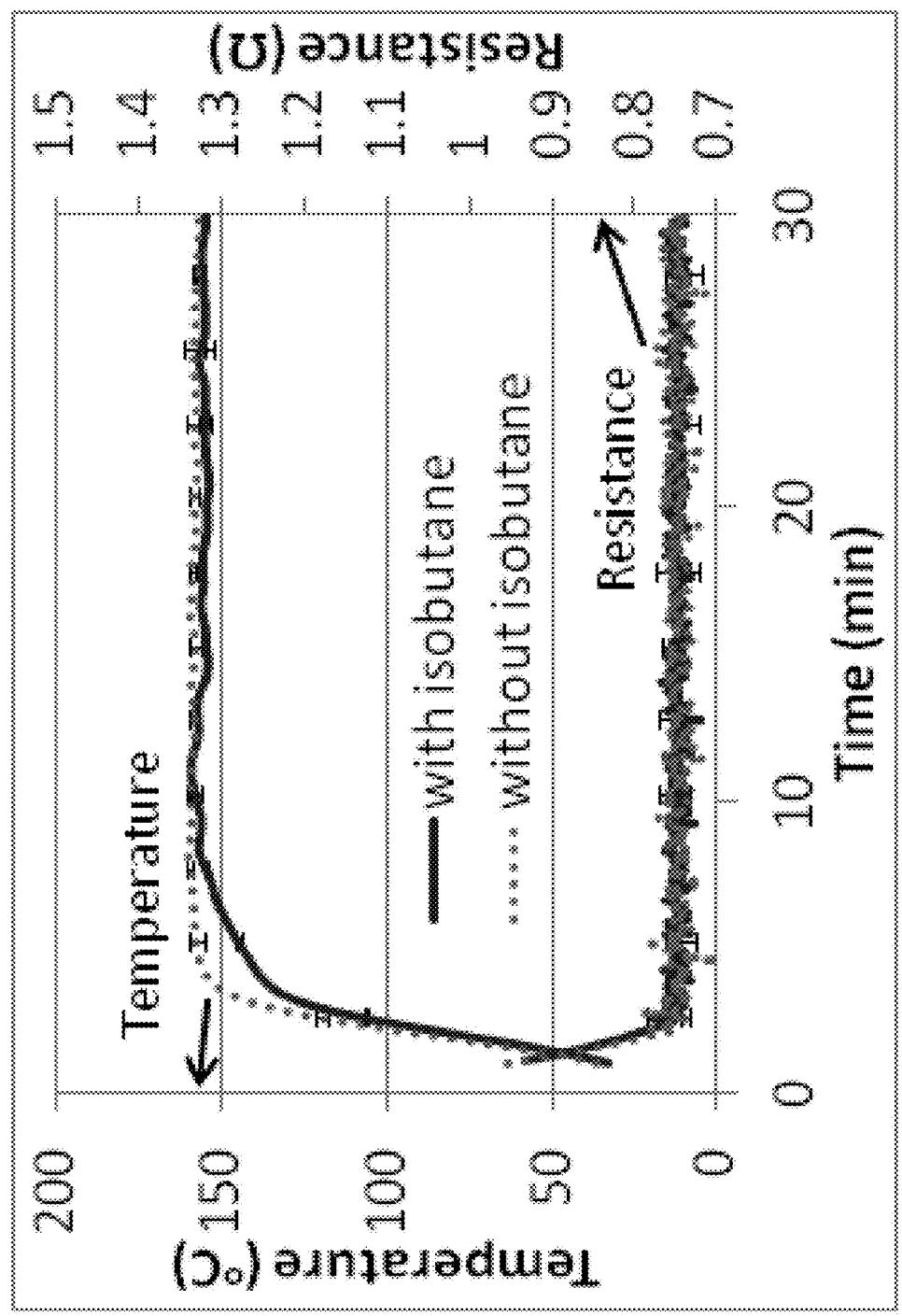
FIGS. 4A and 4B illustrate data from experiments using resistance feedback control for regeneration cycles.
Figure 4B:
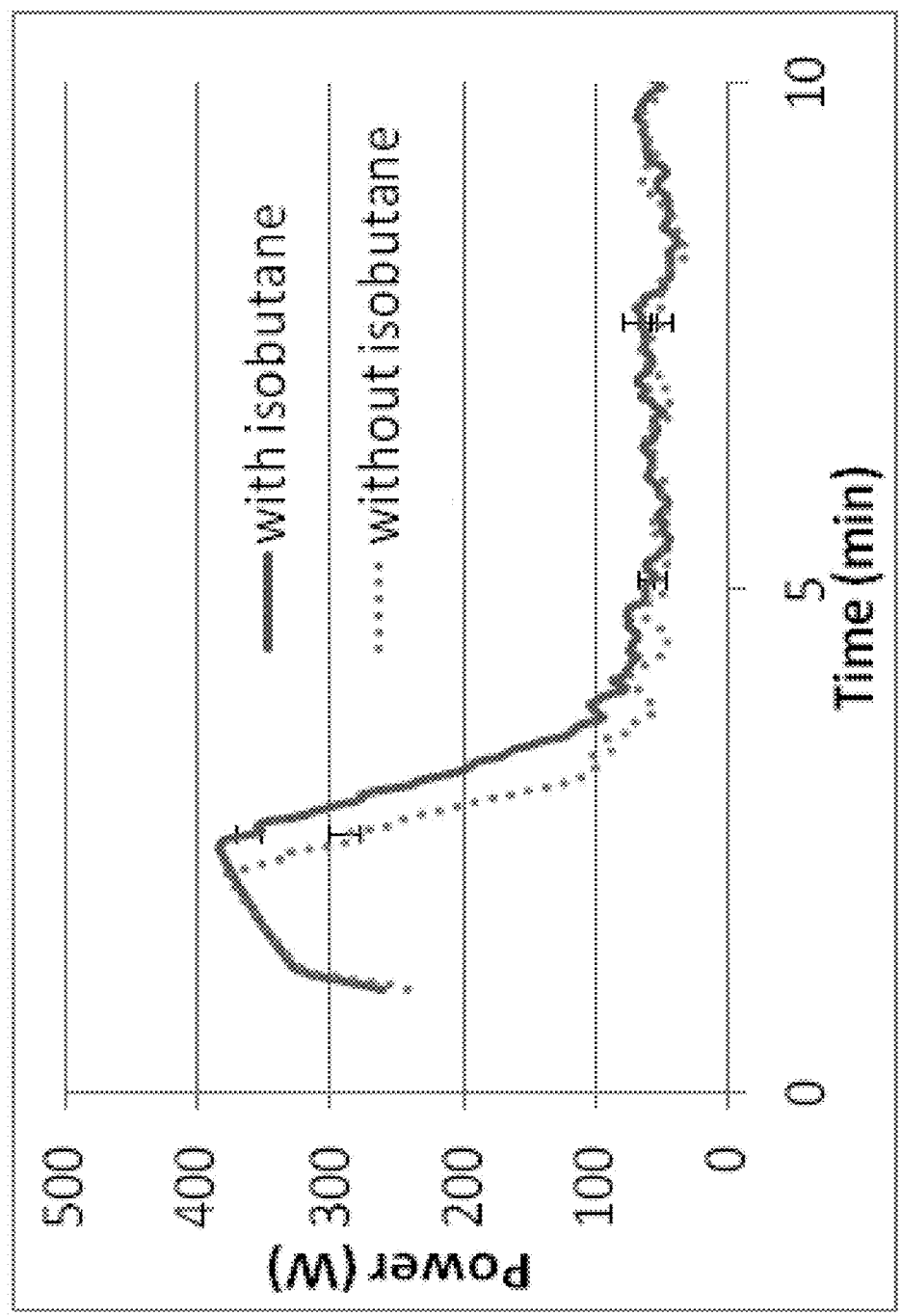

FIGS. 4A and 4B illustrate regeneration conducted with resistance feedback control. The resistance feedback control was used to determine real-time ACFC temperature based on resistance measurements to control the power applied to the ACFC during electrothermal heating to achieve a typical regeneration temperature of 160° C. for a virgin cartridge (dotted lines, "without isobutane") and a cartridge that experienced a preceding adsorption cycle (solid lines, "with isobutane"). The preliminary testing between the virgin cartridge and the cartridge that had been used provides a temperature difference that determines the mass that was desorbed, and these differences can be used to control the regeneration cycle. The temperature was successfully controlled to the 160° C. set-point based on resistance measurements as confirmed with thermocouple measurements. Differences between the temperature and power profiles for tests with and without proceeding isobutane adsorption cycles are attributed to the adsorbed material, which alters the relationship between temperature and resistance and increases the power required for heating. Methods of the invention account for the mass loading in control and are based upon an analysis of the difference in power profiles. The methods of the invention determine real-time mass desorption during desorption cycles and can also determine when the ACFC has been regenerated.

The ACFC regeneration power profile in FIG. 4B can be described as a series of four distinct steps. First, the regeneration power profile increases rapidly, as the controller ramps the voltage to the maximum value (18±1 V AC) to begin electrothermal heating. Second, the voltage remains constant, while the temperature of the ACFC increases. This results in a gradual decrease in resistance and thus a gradual increase in current and power. Third, the resistance reaches the set-point value (temperature stabilizes), and the controller reduces voltage to avoid overshooting the set-point, which results in a corresponding rapid decrease in power application. Forth, heat transfer to the surrounding components reaches steady-state and the voltage stabilizes (6±2 V AC) to maintain the resistance set-point at the regeneration temperature. After an adsorption cycle, additional energy, beyond the energy required to heat the ACFC, is used to also heat and desorb the isobutane. Thus, additional heating time at the maximum voltage level (step 2) is required to reach the regeneration temperature, which is apparent in FIG. 4B. Then, after the isobutane has desorbed from the ACFC, the power profile reaches a steady-state value that is the same as the steady-state value for ACFC without isobutane.

For the data in FIGS. 4A and 4B, "resistance feedback control" was first utilized to heat and maintain the ACFC without adsorbate to a resistance of 0.76Ω, which corresponds to a temperature of 160° C. for the bench-scale system. ACFC that experienced isobutane adsorption to 50% breakthrough as in FIG. 3B was also heated to the same resistance value. FIG. 4 includes the average temperature, resistance, and power profiles for heating ACFC with (three cycles) and without (four cycles) adsorbed isobutane for 30 min. The consistency in resistance control values between each case suggests that differences between temperature and power profiles for the case with and without isobutane can be attributed to the adsorbed material. The larger differences in temperature profiles occurred at the beginning of the regeneration cycle because isobutane decreases the ACFC's electrical resistance, and then the temperature profiles converge as the isobutane desorbs from the ACFC. This indicates that the end of regeneration can be automatically determined as the time when the temperature of ACFC with adsorbate converges within a specified range of the case without adsorbate. This technique to determine the end of regeneration has value because it removes the necessity of a hydrocarbon sensor or other adsorbate detector to detect the end of regeneration, but it still requires local temperature measurement. The power profiles were also examined to determine a technique to detect the end of a regeneration cycle with no hydrocarbon sensor and no local temperature measurement. For regeneration of ACFC both with and without isobutane, power increased to >350 W to achieve rapid initial heating and then dropped to a constant level of 50 W to maintain the ACFC at the regeneration temperature of 160° C.

FIG. 4B has a compressed axis to accentuate differences in power profiles). However, the case with adsorbate took longer to achieve a constant power level because of the added energy requirement for heating and desorbing the isobutane. Thus, this difference in power can be used as to detect the end of desorption.

Figure 5A:
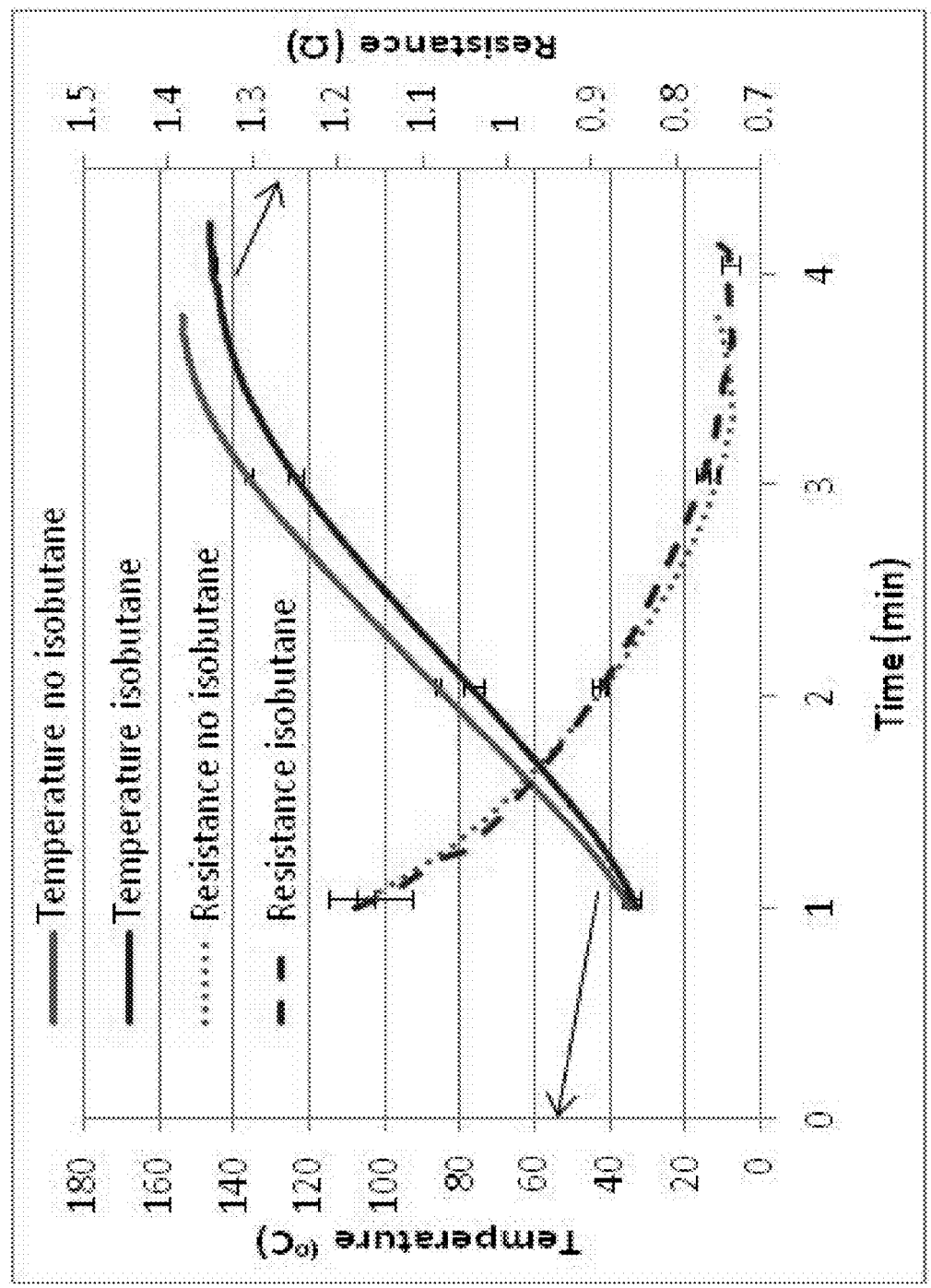
FIGS. 5A and 5B illustrate data from experiments that involve ending a regeneration cycle when the power required to reach a resistance set-point reaches the steady state value for ACFC without adsorbate.
Figure 5B:
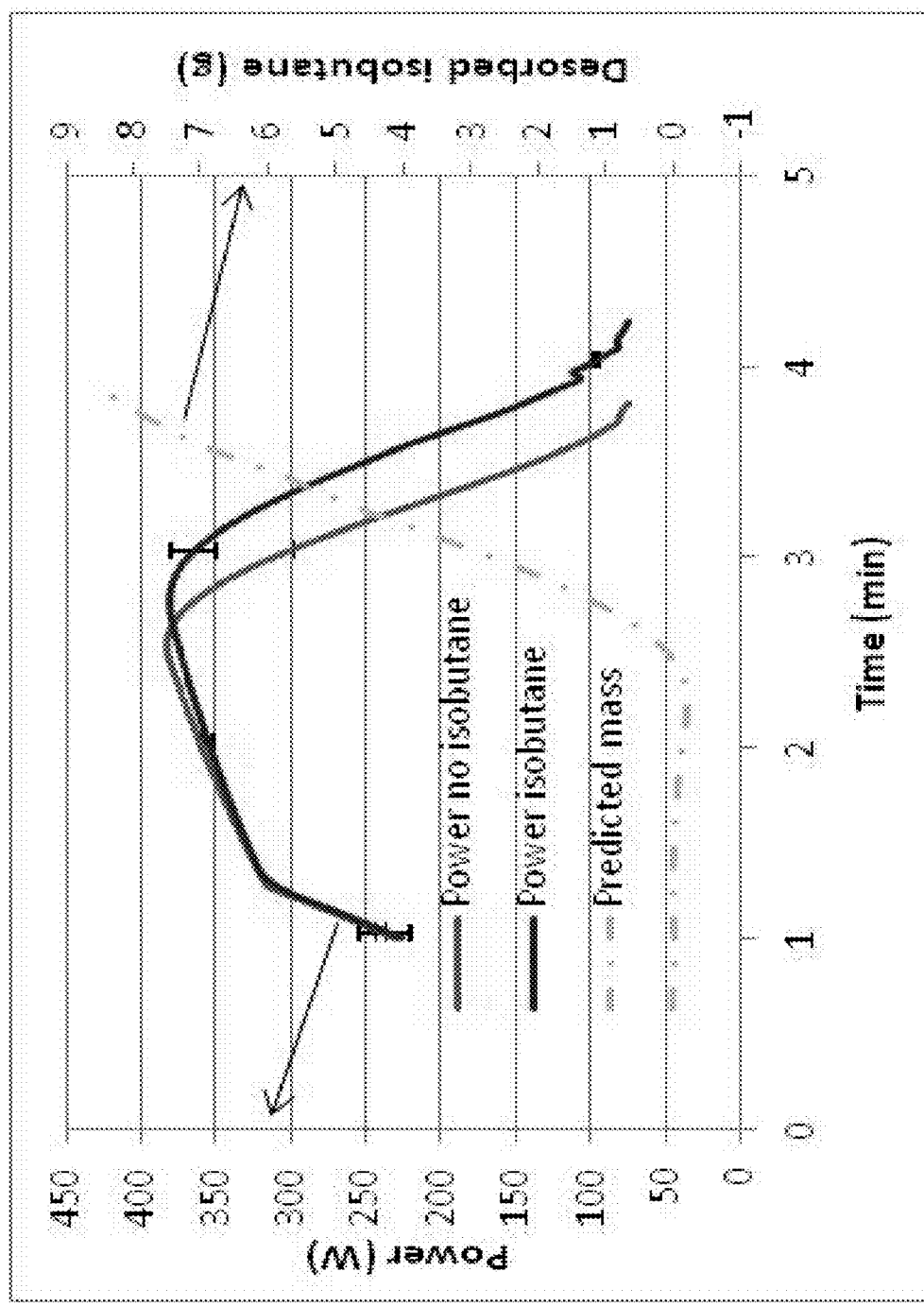

The experiments permitted the energy from the heat of adsorption (Eq 1) to be determined for isobutane. Adsorption was first performed until equilibrium conditions were achieved. The total energy gained during the adsorption cycle is based upon Eq. 1, but modified as follows:

$$E_A = \sum_{k=1}^{n} \frac{\Delta H_{s,iso} P Q x_{iso}(t_{k+1} - t_k)}{RT} \quad \text{(Eq. 5)}$$

Where $\Delta H_{s,iso}$=the isosteric heat of adsorption for isobutane (kJ/mol), P=ambient pressure (atm), Q=flow rate of adsorption gas stream (LPM), $x_{iso}$=the mole fraction of isobutane in the gas stream assuming 100% capture efficiency, $t_i$=time (min), $$R = \text{ideal gas law constant} \left(\frac{\text{atm} \cdot L}{K \cdot \text{mol}}\right),$$

and T=temperature of the adsorbent (K). The heating conditions utilized were reproduced except the regeneration cycle was automatically ended once the power applied to the ACFC dropped to a constant level (<75 W as determined from FIG. 4B) representing the power required to heat ACFC with no adsorbate (FIGS. 5A and 5B). Adsorption is an exothermic reaction. However, the energy is not retained in the adsorbent, but is swept away with the carrier gas stream.

FIGS. 5A and 5B illustrate results from applying consideration of the mass loading in control logic. In the experimental control, ACFC was heated to a resistance set-point until the applied power dropped below 0.66 W/g. These regeneration experiments were conducted with control logic that automatically determines the end of the regeneration cycle based on power profiles from FIG. 4B. For the data in FIG. 5, the regeneration cycle was automatically ended once the power applied to the ACFC dropped to a steady-state level (<0.66 W/g ACFC as determined from FIG. 4B). Temperature and electrical resistance profiles from these tests are provided in FIG. 5A. The difference in energy between the cases for heating ACFC with and without isobutane was utilized to predict the real-time desorbed mass based on the isosteric heat of adsorption for isobutane (assuming negligible energy lost to the heat capacity of the adsorbate) (FIG. 5B, "resistance no isobutane" described by Eq. 4). The total energy consumed to heat the ACFC with and without isobutane was 64.7 and 56 kJ, respectively. The case with isobutane required an additional 19 s of heating before the power dropped to 75 W and based on the following adsorption cycles, 72% of the isobutane was removed. The difference in energy (8.7 kJ) between heating ACFC with and without adsorbate is attributed to the energy required for desorption of the isobutane. Since physical adsorption of isobutane is reversible, the measured desorption energy should be equal to the energy gained during an adsorption cycle calculated based on the isosteric heat of adsorption with Eq. 1 (9.7 kJ). The difference between these energy values (desorption and adsorption) was <12%, which supports using the calculated adsorption energy to predict when to end a regeneration cycle.

The experiments show that indirect power measurements can be used to end a regeneration cycle, which contributes to providing a control method that uses indirect monitoring and control through adsorption, regeneration and cooling cycles without requiring any hydrocarbon or direct temperature sensor. The cumulative applied energy can also be used to end a regeneration cycle, and provides a real-time prediction of desorbed mass, and also does not require a hydrocarbon or direct temperature sensor. Additional experimental details about the regeneration control and characterization of a cartridge can be found in Johnsen, D. L. and Rood, M. J., (2012) Temperature Control during Regeneration of Activated Carbon Fiber Cloth with Resistance-Feedback, Environmental Science & Technology, 46 (20), 11305-11312, which is incorporated by reference herein.

Characterizing Cooling Cycles

Figure 6:
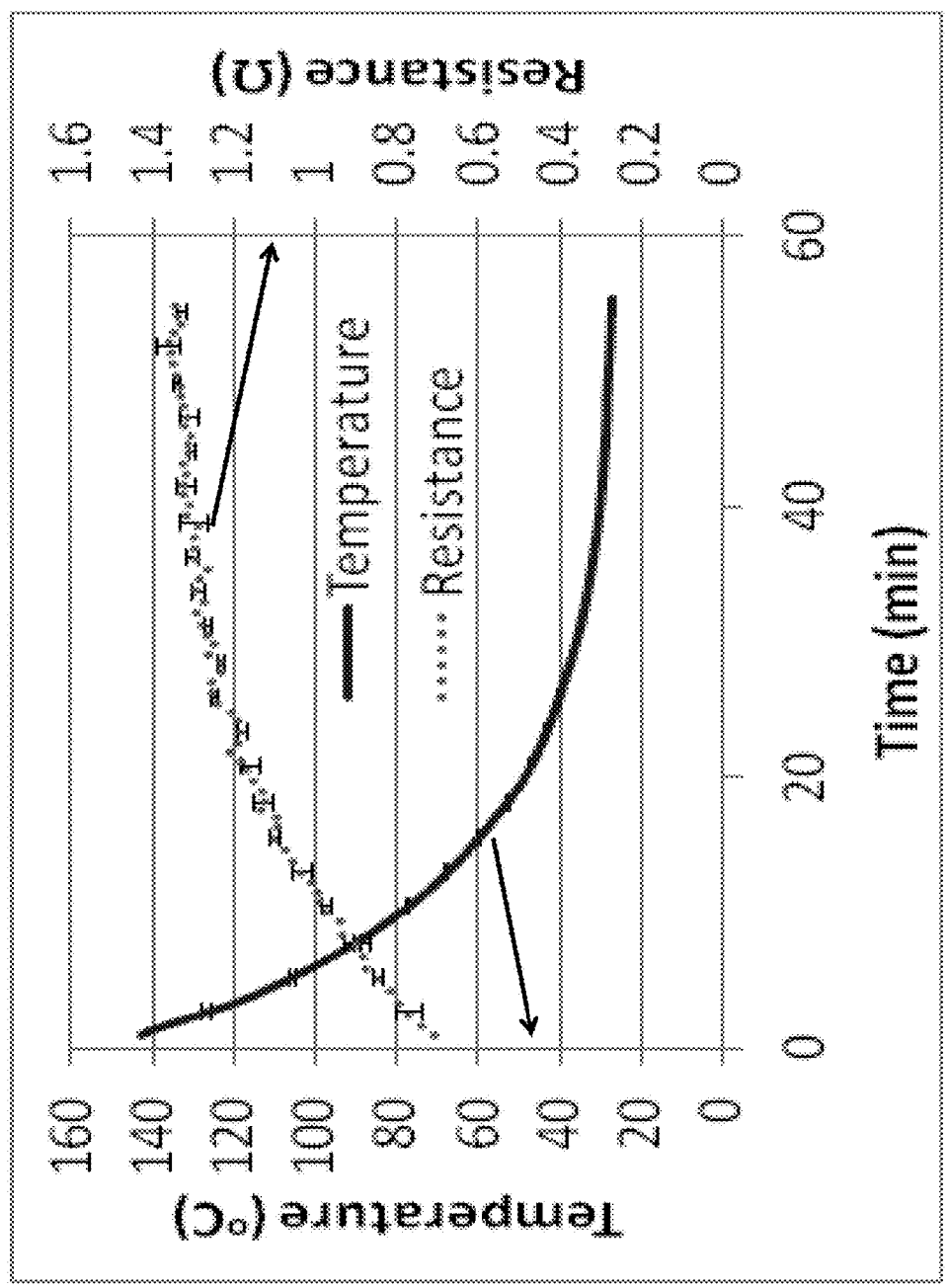
FIG. 6 illustrates temperature and resistance profiles of ACFC during the cooling cycle testing that followed the isobutane adsorption cycles and electrothermal regeneration cycles.

FIG. 6 shows temperature and resistance profiles of ACFC during the cooling cycles that followed the isobutane adsorption cycles and electrothermal regeneration cycles. After heating, the ACFC was cooled with $N_2$ at 0.5 SLPM and the ACFC's resistance and temperature were measured. These profiles demonstrate a strong dependence of resistance on temperature after the ACFC was electrothermally regenerated (adsorbate removed) as temperature decreases from 145° C. to 22° C. These results show that the relationship between temperature and resistance can be used to monitor cooling cycles of the ACFC in preparation for its reuse with another adsorption cycle. In preferred embodiments, both resistance and energy are calculated simultaneously during heating for generation. Only resistance is calculated during cooling, with a small amount of power applied to generate voltage and current measurable by a voltage meter and ammeter.

Resistance values were smaller during the cooling cycles that followed isobutane adsorption/regeneration than the cooling cycles without adsorbate. This is expected since isobutane is not completely desorbed during regeneration cycles and reduces the ACFCs resistance. The resistance profiles converge as the temperature becomes closer to the ambient temperature suggesting the adsorbate mass has a smaller effect on resistance at lower temperatures and can be used to predict the end of a cooling cycle without considering the average remaining adsorbed material, which was 28.2% of the total adsorbed mass for these bench scale experiments. These experiments present characterization of the electrical resistance during ACFC cooling that can be used to determine when to terminate the cooling cycle and initiate the next adsorption cycle, removing the need for temperature sensing during the cooling cycle.

Cyclic ESA based on indirectly measured electrical properties of the adsorbent

Figure 7A:
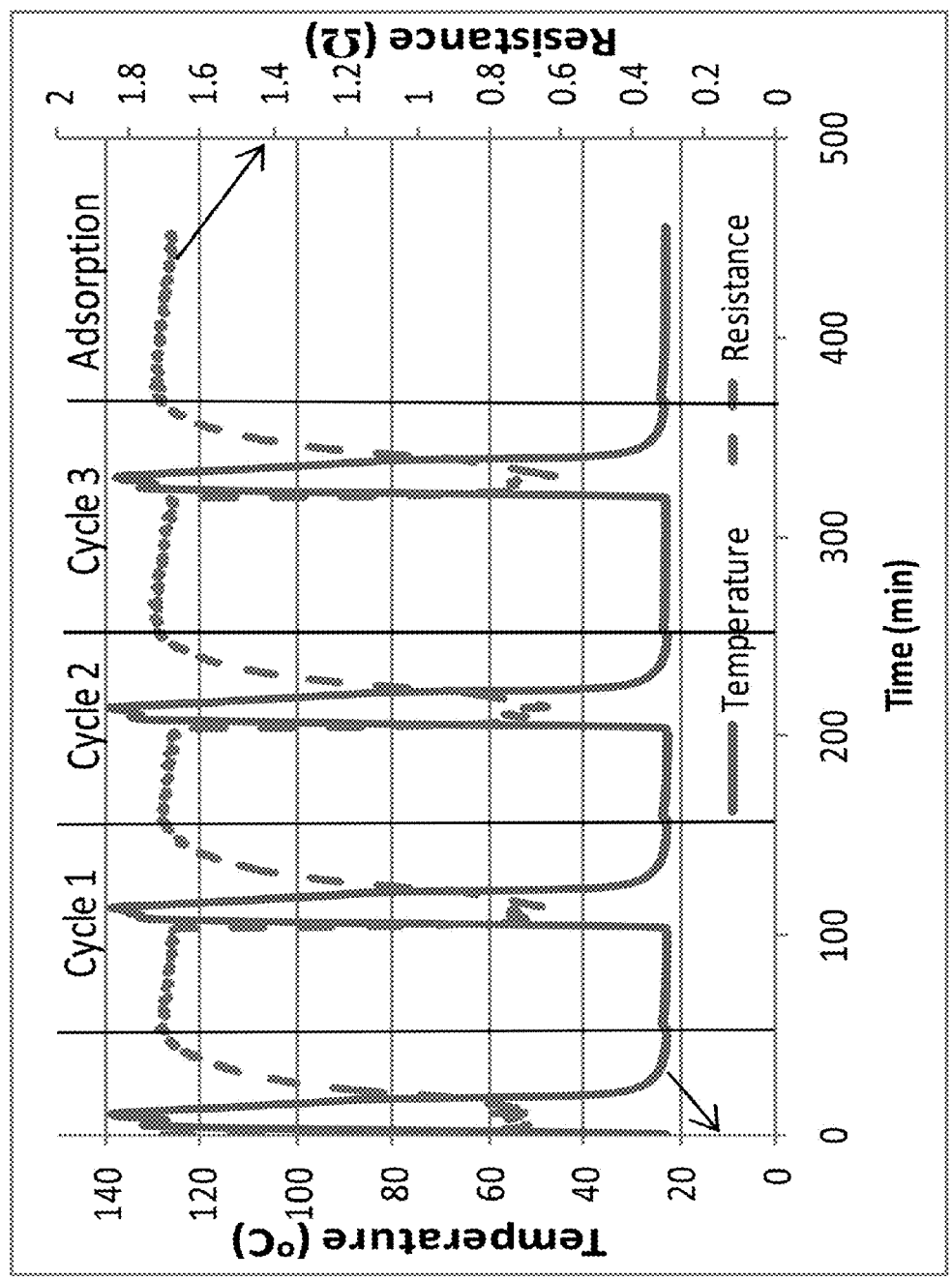
FIGS. 7A and 7B illustrates data from a complete implementation of automated ESA cycling of isobutane from an air stream using indirect electrical measurements.
Figure 7B:
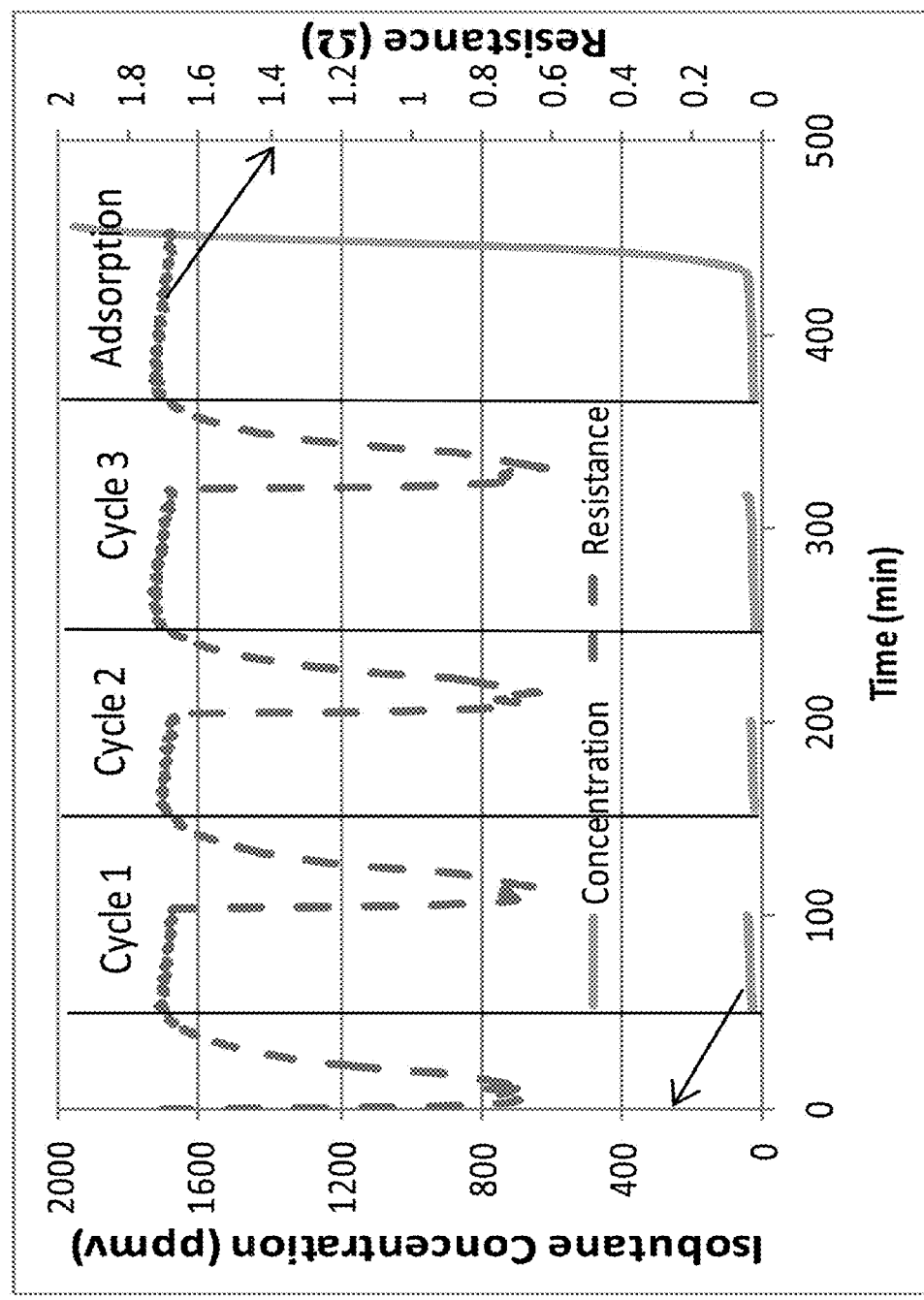

FIGS. 7A and 7B illustrates data from a complete implementation of automated ESA cycling of isobutane from an air stream using indirect electrical measurements (i.e., voltage and current) of the adsorbent without using downstream (e.g., hydrocarbon) sensors or temperature sensors. In addition to the methods described in 0060, for these cyclic tests, a regeneration and cooling cycle were performed before the first cycle to simulate cyclic conditions for the start of the first adsorption cycle. Each adsorption cycle (adsorption cycles 1-3) continued until the electrical resistance of the ACFC decreased by 0.04Ω, corresponding to the breakpoint of the adsorbent when the adsorbent is nearly saturated with isobutane and before breakthrough is detectable by measuring the downstream concentration with a hydrocarbon sensor. A regeneration cycle involved electrothermally heating the ACFC to a resistance set-point of 0.72Ω that corresponded to 140° C. for 10 min. The ACFC cooled in the continuously flowing $N_2$ gas stream until the ACFC's electrical resistance reached a value corresponding to 90° C. At this point, the $N_2$ control valve was closed and the ACFC continued to cool in air at 50 SUM until the ACFC reached a resistance set-point corresponding to ACFC within 1° C. of ambient temperature (22° C.). Such preparation provided initial conditions for the adsorbent to start a complete ESA cycle, which involved adsorption, regeneration, and cooling cycles occurring with three complete ESA cycle (i.e. adsorption cycle 1 is the first adsorption cycle within the first of three ESA cycles).

Three consecutive ESA cycles, each including adsorption, regeneration, and cooling cycles, were controlled entirely based on indirect current and voltage measurements showing the first successful implementation of ESA based on indirect electrical measurements. The resistance adsorption set-point was then manually eliminated to allow the isobutane to reach equilibrium with the ACFC. Temperature and resistance profiles from this test are included in FIG. 7A. When operated with this preferred process of the invention based on electrical measurements, the adsorption vessel did not reach breakthrough, as can be seen from the small concentration values (<50 $ppm_v$) presented in FIG. 7B for cycles 1-3. Advantageously, the method does not require adsorbate breakthrough to determine the end of an adsorption cycle and can thus achieve higher capture efficiency and reduce emissions of the isobutane to the ambient environment.

The experiments demonstrated that each cycle for a new indirect process for operating an ESA system that eliminates hydrocarbon sensors and temperature sensors, and includes methods for determining the real-time predictions of the mass of adsorbed and desorbed material during its adsorption and regeneration cycles, respectively, and the temperature of the adsorbent during its regeneration and cooling cycles. The experiments were performed at the bench-scale to validate each of these three cycles required for ESA. Each cycle was controlled at the bench scale based only on indirect electrical voltage, and current measurements. Automated ACFC adsorption, regeneration, and cooling cycles have also been performed successfully in series based on indirect electrical voltage and current measurements to achieve thermal swing adsorption (i.e., ESA).

The experiments with isobutane can be repeated, of course, with other adsorbates. Once the effect of mass loading is determined during adsorption, then the indirect electrical measurement are accurate with a control strategy of the invention to determine when to regeneration.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for indirectly monitoring and controlling an electrically resistive adsorption system, comprising:
    adsorbing of a predetermined adsorbate while indirectly monitoring electrical resistance of a unified adsorbent element;
    predicting breakthrough of said predetermined adsorbate based upon the indirectly monitored electrical resistance and a previously acquired mass loading relationship between the resistance of the unified adsorbent element and the loading of the unified adsorbent element with the predetermined adsorbate and halting said adsorbing based upon the predicted breakthrough;
    controlling power application to thermally regenerate the adsorbent element to achieve an indirectly monitored resistance set-point;
    cooling the adsorbent element subsequent to regeneration while indirectly monitoring temperature of the unified adsorbent and recommencing said adsorbing when a predetermined adsorption temperature has been reached.

2. The method of claim 1, further comprising preliminary system characterization comprising:
    characterizing adsorption capacity of the unified adsorbent element by resistance to determine the mass loading relationship; and
    characterizing the resistance versus temperature of the unified adsorbent element to determine the predetermined adsorption temperature.

3. The method of claim 1, wherein the indirect monitoring of electrical resistance comprises applying a small amount of power to the adsorbent material producing essentially no heating and measuring current and/or voltage to determine resistance.

4. The method of claim 3, wherein said applying a small amount of power comprises applying voltage to maintain a constant current to determine resistance.

5. The method of claim 1, wherein said regenerating is ended after a predetermined time period.

6. The method of claim 1, wherein said controlling power to thermally regenerate is ended when the power required to heat to the resistance set-point is equal or within a range of the power required to heat to the resistance set-point for the adsorbent without adsorbate.

7. The method of claim 1, wherein the controlling power to thermally regenerate is ended when the desorbed mass is equal or within a selected range of the adsorbed mass from the preceding adsorption cycle.

8. The method of claim 7, wherein the real-time adsorbed mass ($M_A$) during an adsorption cycle is determined as follows:

$$M_A = \sum_{k=0}^{n} M_W \frac{PQx_{iso}(t_{k+1} - t_k)}{RT}$$

where $M_W$=molecular weight of adsorbate (g/mol), P=ambient pressure (atm), Q=flow rate of adsorption gas stream at ambient temperature and pressure (LPM), $x_{iso}$=the mole fraction of isobutane in the gas stream assuming 100% capture efficiency, $t_k$=time (min), $$R = \text{ideal gas law constant } \left(\frac{atm \cdot L}{K \cdot mol}\right),$$

and T=ambient temperature (K).

9. The method of claim 8, wherein the real-time desorbed mass ($M_D$) is determined as:

$$M_D = \frac{M_W}{\Delta H_S} \sum_{k=0}^{k} (I_A V_A - I_o V_o)(t_{k+1} - t_k)$$

where, $\Delta H_s$=the heat of adsorption of the adsorbate onto the adsorbent, and $I_i$=RMS current (A) and $V_i$=RMS voltage (V) for ACFC with condition i where i=A is ACFC with adsorbate and i=o is ACFC without adsorbate.

10. The method of claim 1, wherein the unified adsorbent element comprises an activated carbon fiber cloth (ACFC) cartridge housed in an adsorption vessel.

11. The method of claim 10, wherein the unified adsorbent element comprises a plurality of unified adsorbent elements.

12. The method of claim 10, wherein the indirect monitoring of resistance and temperature are conducted by measuring voltage and current applied to the activated carbon element.

13. The method of claim 1, wherein the indirect monitoring of resistance and temperature are conducted by measuring voltage and current applied to the unified adsorption element.

* * * * *